(12) United States Patent
Hillary et al.

(10) Patent No.: US 10,278,114 B2
(45) Date of Patent: *Apr. 30, 2019

(54) SYSTEMS, METHODS, AND APPARATUS FOR GEOLOCATION PLATFORM MECHANICS

(71) Applicant: Gamesys Ltd., London (GB)

(72) Inventors: Thomas Hillary, Silverstone (GB); Robert Anthony Breedt, London (GB); Jeffrey Paul Bannister, Herfordshire (GB); Michael Christopher McCarthy, London (GB)

(73) Assignee: Gamesys Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,735

(22) Filed: May 1, 2018

(65) Prior Publication Data
US 2018/0249398 A1 Aug. 30, 2018

Related U.S. Application Data

(63) Continuation of application No. 15/666,831, filed on Aug. 2, 2017, now Pat. No. 9,961,614, which is a
(Continued)

(51) Int. Cl.
*H04W 24/00* (2009.01)
*H04W 48/04* (2009.01)
(Continued)

(52) U.S. Cl.
CPC .......... *H04W 48/04* (2013.01); *H04W 4/021* (2013.01); *H04W 4/023* (2013.01); *H04W 12/06* (2013.01); *H04W 12/08* (2013.01); *H04W 60/00* (2013.01)

(58) Field of Classification Search
CPC ..... H04W 8/183; H04W 48/18; H04W 36/30; H04W 36/18; H04W 36/12; H04W 36/04;
(Continued)

(56) References Cited

U.S. PATENT DOCUMENTS 7,035,626 B1 4/2006 Luciano
7,571,240 B2 8/2009 Kiyose
(Continued)

FOREIGN PATENT DOCUMENTS

GB 2468833 9/2010

OTHER PUBLICATIONS

Written Opinion for PCT/IB2014/064837 dated Dec. 1, 2014; 6 pps.
(Continued)

*Primary Examiner* — Dai Phuong
(74) *Attorney, Agent, or Firm* — Michael D. Downs; Fincham Downs LLC

(57) ABSTRACT

Systems, apparatus, methods, and articles of manufacture provide for geolocating a user and/or a user device, based on one or more location data sources. Some embodiments may include use of a user authentication process (e.g., a two-factor authentication service) to improve confidence in the determined location of a user device. In one embodiment, a user and/or a user device may be allowed or denied access to restricted access content based on the determined location of the device.

22 Claims, 13 Drawing Sheets

Related U.S. Application Data continuation of application No. 15/359,328, filed on Nov. 22, 2016, now Pat. No. 9,749,931, which is a continuation of application No. 14/496,027, filed on Sep. 25, 2014, now Pat. No. 9,521,521.

(60) Provisional application No. 61/882,458, filed on Sep. 25, 2013, provisional application No. 61/882,453, filed on Sep. 25, 2013.

(51) Int. Cl.
  *H04W 4/02* (2018.01)
  *H04W 12/06* (2009.01)
  *H04W 60/00* (2009.01)
  *H04W 4/021* (2018.01)
  *H04W 12/08* (2009.01)

(58) Field of Classification Search
  CPC ..... H04W 16/32; H04W 24/00; H04W 28/04; H04W 72/082; H04W 4/02; H04W 64/00; H04L 29/08657
  USPC .... 455/404.2, 432.1, 440, 443, 456.1–456.3, 455/457; 370/330–334
  See application file for complete search history.

(56) References Cited

U.S. PATENT DOCUMENTS

| | | | |
|---|---|---|---|
| 7,828,652 B2 | 11/2010 | Nguyen | |
| 7,828,654 B2 | 11/2010 | Carter | |
| 7,867,083 B2 | 1/2011 | Wells | |
| 8,226,474 B2 | 8/2012 | Nguyen | |
| 8,244,216 B1 | 8/2012 | Becker | |
| 8,504,617 B2 | 8/2013 | Amaitis | |
| 2003/0017871 A1 | 1/2003 | Urie | |
| 2004/0157600 A1* | 8/2004 | Stumpert | H04W 36/10 455/432.1 |
| 2004/0203667 A1* | 10/2004 | Schroeder | H04W 48/04 455/414.1 |
| 2006/0265231 A1 | 11/2006 | Fusaro et al. | |
| 2008/0026767 A1 | 1/2008 | Krstulich | |
| 2008/0102956 A1 | 5/2008 | Burman | |
| 2009/0305666 A1* | 12/2009 | Tian | H04W 60/04 455/410 |
| 2010/0062722 A1 | 3/2010 | Dykema | |
| 2010/0124914 A1 | 5/2010 | Schmidt | |
| 2010/0173628 A1* | 7/2010 | Hosain | H04W 48/18 455/432.1 |
| 2010/0246467 A1 | 9/2010 | Song | |
| 2010/0332339 A1 | 12/2010 | Patel et al. | |
| 2011/0090872 A1 | 4/2011 | Dahlen | |
| 2011/0189981 A1 | 8/2011 | Faith | |
| 2011/0195791 A1 | 8/2011 | Walker | |
| 2012/0028647 A1 | 2/2012 | Casati | |
| 2012/0045992 A1 | 2/2012 | Kwon | |
| 2012/0046096 A1 | 2/2012 | Morrison et al. | |
| 2012/0108245 A1 | 5/2012 | Zhang | |
| 2012/0115512 A1 | 5/2012 | Grainger | |
| 2012/0129596 A1 | 5/2012 | Thackston | |
| 2012/0142379 A1 | 6/2012 | Park | |
| 2012/0231794 A1 | 9/2012 | Lieshout et al. | |
| 2012/0289230 A1 | 11/2012 | Uno | |
| 2012/0327908 A1* | 12/2012 | Gupta | H04W 36/0011 370/331 |
| 2013/0065600 A1 | 3/2013 | Lim | |
| 2013/0143526 A1 | 6/2013 | Kanugovi et al. | |
| 2013/0190018 A1 | 7/2013 | Mathews | |
| 2013/0218601 A1 | 8/2013 | Webb | |
| 2013/0229971 A1* | 9/2013 | Siomina | H04W 24/10 370/312 |
| 2013/0231138 A1 | 9/2013 | Hans | |
| 2013/0303186 A1 | 11/2013 | Gordon | |
| 2013/0337814 A1 | 12/2013 | Wong | |
| 2014/0018103 A1 | 1/2014 | Wigren | |
| 2014/0051465 A1 | 2/2014 | Ruys | |
| 2014/0135019 A1 | 5/2014 | Jang et al. | |
| 2014/0141804 A1* | 5/2014 | Zelinka | G01S 5/0284 455/456.2 |
| 2014/0199983 A1 | 7/2014 | Bergstrom | |
| 2014/0328328 A1* | 11/2014 | Lindoff | H04W 72/042 370/332 |
| 2014/0349673 A1 | 11/2014 | Youssef et al. | |
| 2015/0024773 A1 | 1/2015 | Li et al. | |
| 2015/0056995 A1 | 2/2015 | Baillargeon | |
| 2015/0072704 A1 | 3/2015 | Colby et al. | |
| 2015/0163630 A1 | 6/2015 | Hughes, Jr. | |
| 2015/0208294 A1 | 7/2015 | Lee | |
| 2015/0237578 A1 | 8/2015 | Gogate | |
| 2015/0254360 A1 | 9/2015 | Fieweger et al. | |
| 2015/0304914 A1 | 10/2015 | Uchino | |
| 2016/0036539 A1 | 2/2016 | Fix et al. | |
| 2016/0100292 A1 | 4/2016 | Frank | |
| 2016/0198431 A1 | 7/2016 | Pattabiraman et al. | |
| 2016/0205559 A1 | 7/2016 | Dinan | |

OTHER PUBLICATIONS

International Search Report for PCT/IB2014/064837 dated Dec. 1, 2014; 3 pps.
International Preliminary Report on Patentability for PCT/IB2014/064837 dated Mar. 29, 2016; 7 pps.
Office Action for U.S. Appl. No. 14/496,027 dated May 9, 2016; 27 pps.
Notice of Allowance for U.S. Appl. No. 14/496,027 dated Oct. 14, 2016; 10 pps.
Office Action for U.S. Appl. No. 15/359,328 dated Mar. 8, 2017; 12 pps.
Notice of Allowance for U.S. Appl. No. 15/359,328 dated Jun. 12, 2017; 8 pps.
Office Action for U.S. Appl. No. 15/666,831 dated Aug. 24, 2017; 18 pps.
Notice of Allowance for U.S. Appl. No. 15/666,831 dated Dec. 21, 2017; 9 pps.

\* cited by examiner

SYSTEMS, METHODS, AND APPARATUS FOR GEOLOCATION PLATFORM MECHANICS

CROSS-REFERENCE TO RELATED APPLICATIONS

The present application claims the benefit of priority of U.S. Provisional Patent Application No. 61/882,458 filed Sep. 25, 2013, entitled "GEOLOCATION PLATFORM MECHANICS." The present application claims the benefit of priority of U.S. Provisional Patent Application No. 61/882,453 filed Sep. 25, 2013, entitled "GEOLOCATION PLATFORM MECHANICS." Each of the above-referenced applications is incorporated by reference in the present application.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

A. Introduction

Figure 1:
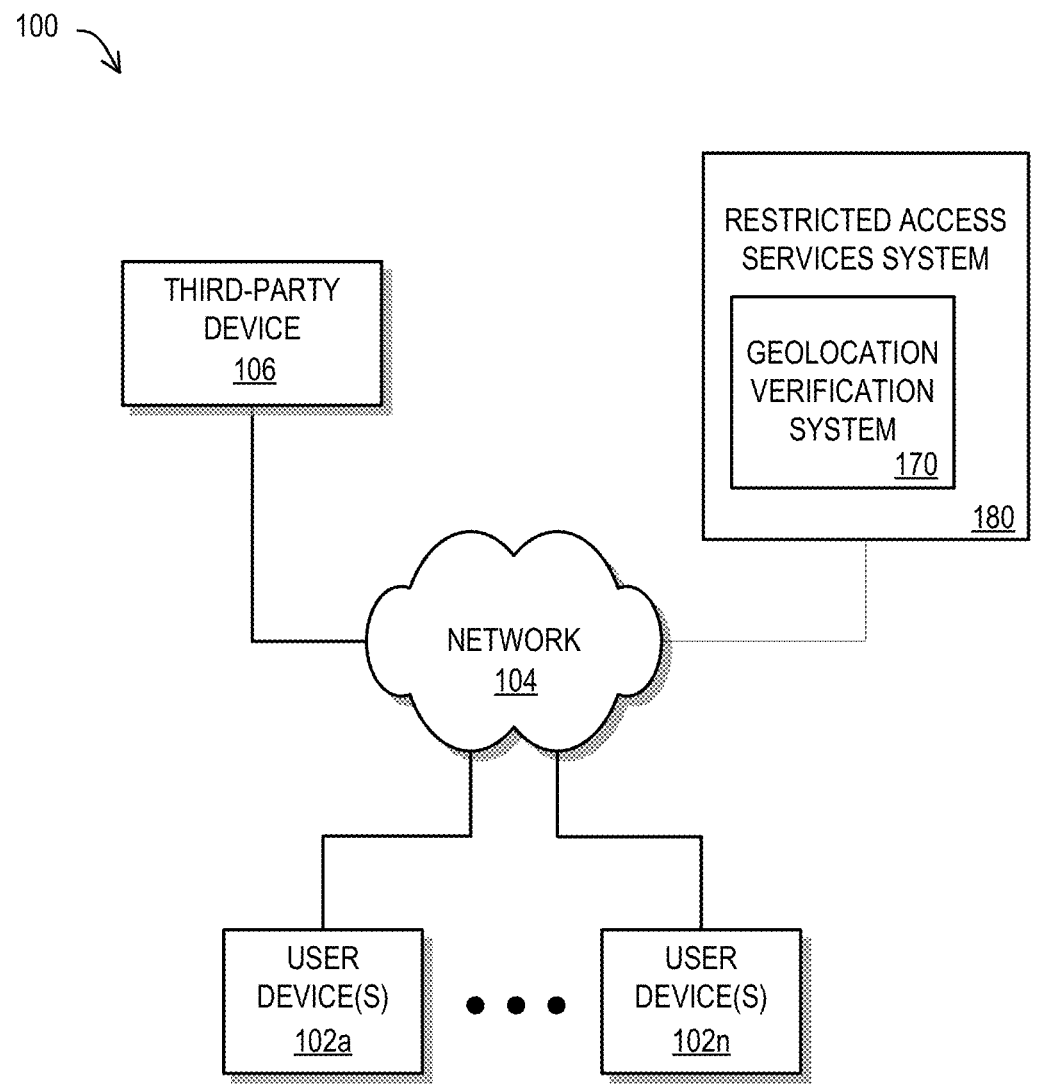
FIG. 1 is a block diagram of a system according to an embodiment of the present invention.

Some embodiments of the present invention are generally directed to improving the accuracy of and/or better assessing the appropriate level of confidence in the location determined for various types of devices. One or more embodiments are directed to providing a higher level of confidence that geolocation results for a given device are accurate (e.g., that the device is actually located in a determined geographical area indicated by one or more types of geolocation services). Some embodiments provide generally for more accurate representations of the potential geographical area in which a device is likely located. In some embodiments, a combination of information from various available services (e.g., on-device geolocation services, off-device geolocation services, and authentication services) may be optimized to reduce the risk spoofing and other types of workarounds. In accordance with some embodiments, prioritizing and/or optimizing which types of geolocation services should be used (when available), and/or when or how often they should be used, may advantageously decrease the power consumption by the devices being tracked.

Determining the appropriate degree of the confidence in geolocation results may offer advantages to various types of systems and situations. More accurate geolocation results may assist in tracking users, finding users in emergencies, and/or improved navigation guidance. There are a number of situations where it is advantageous to ascertain the location of a device with respect to predetermined boundaries that define one or more geographical areas. In one example, access to services (online and/or real world services) may be restricted according to where a user is located. For instance, a streamed video or audio service provider may want to, or may be permitted to, provide streamed video or audio only to subscribers or registered devices that are located within a certain area, and may not provide service to subscribers or registered devices outside the area. Similarly, where different countries share a land border, different entities in those different countries may be responsible for providing services (e.g., vehicle breakdown services, police services) within their own borders but may not be responsible, or may not be permitted, to provide such services in adjacent countries. Within one country, different entities can be responsible for different areas. For instance, a boat breakdown service entity may be capable of providing resources to aid a user of a device located in an area that relates to a sea, lake, ocean or estuary, whereas a car breakdown entity may be better capable of providing resources to aid the user of the device when located in an area that relates to land. Online access to these entities' services can be limited such that only the appropriate entity's service can be accessed by a user of a device, based on the user's location. Various other situations in which restricting online service provision based on device location exist; some are discussed in this disclosure, and still others may be readily understood by those skilled in the art in light of this disclosure.

In accordance with some embodiments of the present invention systems and methods for securing access to restricted access services provide for receiving, from a user device, a request to grant a user access, via the user device, to a restricted access service that is restricted to users located in a predefined area. According to some embodiments, systems and methods may further provide for one or more of: determining that the user is in possession of a mobile device registered with the restricted access service (e.g., based on a two-factor user authentication service); determining, using a first location data source (e.g., an on-device location data source), first location data associated with the user device, wherein the first location data source is associated with a first accuracy value (e.g., an accuracy radius); determining, using a second location data source (e.g., an off-device location data source), second location data associated with the user device, wherein the second location data source is associated with a second accuracy value. In one embodiment, a system comprises a processor and a computer-readable memory in communication with the processor, the computer-readable memory storing instructions that when executed by the processor direct the processor to perform one or more of the functions described above.

According to some embodiments, systems and methods for device geolocation may comprise determining, based on the first accuracy value and the second accuracy value, which of the first or the second location data sources is the more accurate and/or determining that one of the data location sources is not less accurate than the other location data source. In some embodiments, the more accurate location data source may be referred to as the "primary" location data source.

According to some embodiments, systems and methods for geolocation system may further provide for one or more of: determining a first geographical area based on the first location data and the first accuracy value; determining that the first geographical area is wholly located within the predefined area; determining a second geographical area based on the second location data and the second accuracy value; and determining whether at least one of the following conditions is satisfied: (i) the first geographical area and the second geographical area overlap, and (ii) the second geographical area is wholly located within the predefined area.

According to some embodiments, systems and methods for device geolocation system may further provide for one or more of: after determining whether at least one of the conditions is satisfied and determining whether the user is in possession of the mobile device registered with the restricted access service, determining whether the user device is located in the predefined area; and allow or denying the user device to access the restricted access service.

In accordance with some embodiments of the present invention, one or more systems, apparatus, methods, articles of manufacture, and/or computer readable media (e.g., a non-transitory computer readable memory storing instructions for directing a processor) provide for determining, using an on-device location data source, first location data associated with a device. According to some embodiments, the on-device location data source may comprise, for example and without limitation, one or more of: GPS, wireless network device locations (e.g., based on the locations of BSSIDs identifying Wi-Fi® network devices or identified wireless devices on other types of wireless networks), cellular network triangulation, and/or cellular or mobile network tower sites (also referred to in this disclosure as "cell towers" or "cell sites"). Although this disclosure may refer to "towers" when discussing components of cellular and/or other types of communications networks, it will be understood that this is not limited to actual "tower" or "mast" structures, but that "cell tower" may refer to any fixed or mobile cellular network site (e.g., including a transmitter, receiver, or transceiver) used to create a cell for a cellular network. In one or more embodiments, the on-device location data source is associated with an accuracy value (e.g., an accuracy range of the on-device location data source, an accuracy radius). Some embodiments further may comprise determining a first geographical area based on the first location data and the first accuracy value associated with the on-device location data source. In one embodiment, the first location data may include an indication of a first geographic location identified by the on-device location data source (e.g., GPS coordinates). According to some embodiments, determining the first geographical area comprises determining the first geographical area based on the accuracy radius and the first geographic location (e.g., determining a circular area defined by an accuracy radius from a determined set of GPS coordinates).

In accordance with some embodiments of the present invention, one or more systems, apparatus, methods, articles of manufacture, and/or computer readable media (e.g., a non-transitory computer readable memory storing instructions for directing a processor) provide for one or more of:
a) determining, using a first location data source (e.g., an on-device or off-device location data source), first location data associated with a device (e.g., wherein the first location data indicates a geolocation of the device);
b) determining, using a second location data source (e.g., an on-device or off-device location data source), second location data associated with the device (e.g., wherein the second location data indicates a geolocation of the device);
c) determining, based on the first and second location data, whether the device is within a predefined area (e.g., within a country, state, province, county, town, etc.,); and
d) determining whether a user (e.g., a subscriber or other registered user) is in possession of and/or co-located with the device.

B. General Systems and Structures

Referring first to FIG. 1, a block diagram of a system 100 according to some embodiments is shown. In some embodiments, the system 100 may comprise a plurality of user devices 102*a-n*, a network 104, a third-party device 106, and/or a restricted access services system 180. As depicted in FIG. 1, any or all of the devices 102*a-n*, 106, 180 (or any combinations thereof) may be in communication via the network 104. In some embodiments, the system 100 may be utilized to provide online services to which access is restricted to certain users or types of users (e.g., services limited to users in a predetermined geographic area such as a country, county or state). The restricted access services system 180 may, for example, interface with one or more of the user devices 102*a-n* and/or the third-party device 106 to acquire, gather, aggregate, process, and/or utilize user, geolocation, mobile device, and/or other data or metrics in accordance with embodiments described in this disclosure. In some embodiments, the restricted access services system may comprise a geolocation verification system 170 for determining, analyzing, and/or verifying a location of users and/or one or more devices (e.g., mobile devices, desktop devices) associated with users. In one example, a geolocation verification system 170 may determine whether a user of a restricted access service is in an area where that service can be provided, and if so, the restricted access services system 180 may permit the user to access the service.

Fewer or more components 102*a-n*, 104, 106, 180 and/or various configurations of the depicted components 102*a-n*, 104, 106, 180 may be included in the system 100 without deviating from the scope of embodiments described herein. In some embodiments, the components 102*a-n*, 104, 106, 180 may be similar in configuration and/or functionality to similarly named and/or numbered components as described herein. In some embodiments, the system 100 (and/or portion thereof) may comprise a services platform programmed and/or otherwise configured to execute, conduct, and/or facilitate any of the various methods and/or portions or combinations thereof described herein.

The user devices 102*a-n*, in some embodiments, may comprise any types or configurations of computing, mobile electronic, network, user, and/or communication devices that are or become known or practicable. The user devices 102*a-n* may, for example, comprise one or more Personal Computer (PC) devices, computer workstations (e.g., underwriter workstations), tablet computers such as an iPad® manufactured by Apple®, Inc. of Cupertino, Calif., and/or cellular and/or wireless telephones such as an iPhone® (also manufactured by Apple®, Inc.) or a G3™ smart phone manufactured by LG® Electronics, Inc. of San Diego, Calif., and running the Android® operating system from Google®, Inc. of Mountain View, Calif. In some embodiments, the user devices 102*a-n* may comprise devices owned and/or operated by one or more users such as customers of an online service. According to some embodiments, the user devices 102*a-n* may communicate with the restricted access services system 180 via the network 104, such as to register with a services provider, request access to online services, and/or transmit information about a location of a user device to geolocation verification system 180.

In some embodiments, the user devices 102*a-n* and/or the third-party device 106 may comprise one or more servers and/or controller devices configured and/or coupled to determine geolocation information associated with a user and/or a user device. In some embodiments, such geolocation information may be provided to the geolocation verification system 170 and/or restricted access services system 180, such as for determining a location of a user and/or a user device.

The network 104 may, according to some embodiments, comprise a Local Area Network (LAN; wireless and/or wired), cellular telephone, Bluetooth®, and/or Radio Frequency (RF) network with communication links between the restricted access services system 180, the user devices 102*a-n*, and/or the third-party device 106. In some embodiments, the network 104 may comprise direct communications links between any or all of the components 102*a-n*, 106, 180 of the system 100. The user devices 102*a-n* may, for example, be directly interfaced or connected to one or more of the geolocation verification system 170, the restricted access services system 180 and/or the third-party device 106 via one or more wires, cables, wireless links, and/or other network components, such network components (e.g., communication links) comprising portions of the network 104. In some embodiments, the network 104 may comprise one or many other links or network components other than those depicted in FIG. 1. The user devices 102*a-n* may, for example, be connected to the restricted access services system 180 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks deemed practicable for a particular implementation. According to some embodiments, the network 104 may comprise a conglomeration of different sub-networks and/or network components interconnected, directly or indirectly, by the components 102*a-n*, 106, 170, 180 of the system 100. The network 104 may comprise one or more cellular telephone networks with communication links between the user devices 102*a-n* and the restricted access services system 180, for example, and/or may comprise the Internet, with communication links between the restricted access services system 180 and the third-party device 106, for example.

The third-party device 106, in some embodiments, may comprise any type or configuration of computerized processing device(s) such as a PC, laptop computer, computer server, database system, and/or other electronic device, devices, or any combination thereof. In some embodiments, the third-party device 106 may be owned and/or operated by a third-party (i.e., an entity different than any entity owning and/or operating either the user devices 102*a-n* or the restricted access services system 180). The third-party device 106 may, for example, be owned and/or operated by a data and/or data service provider (e.g., an online maps and/or navigation service, a GPS service, a Wi-Fi router, a BSSID location data service, a communications carrier, a mobile network operator, a user authentication service). In some embodiments, the third-party device 106 may supply and/or provide data such as user, geolocation, and/or other data to the geolocation verification system 170, the restricted access services system 180 and/or the user devices 102*a-n*. In some embodiments, the third-party device 106 may comprise a plurality of devices and/or may be associated with a plurality of third-party entities.

In some embodiments, the restricted access services system 180 and/or the geolocation verification system 170 may comprise an electronic and/or computerized controller device, such as a computer server communicatively coupled to interface with the user devices 102*a-n* and/or the third-party device 106 (directly and/or indirectly). The restricted access services system 180 may, for example, comprise one or more PowerEdge™ M910 blade servers manufactured by Dell®, Inc. of Round Rock, Tex. which may include one or more Eight-Core Intel® Xeon® 7500 Series electronic processing devices. According to some embodiments, the restricted access services system 180 may be located remote from one or more of the user devices 102*a-n* and/or the third-party device 106. The restricted access services system 180 may also or alternatively comprise a plurality of electronic processing devices located at one or more various sites and/or locations.

According to some embodiments, the geolocation verification system 170 and/or the restricted access services system 180 may store and/or execute specially programmed instructions to operate in accordance with embodiments described herein. The geolocation verification system 170 may, for example, execute one or more programs that facilitate determining the location of users and/or user devices. According to some embodiments, the geolocation verification system 170 may comprise a computerized processing device such as a PC, laptop computer, computer server, and/or other electronic device to manage and/or facilitate analysis and/or communications regarding the user devices 102*a-n*. An online content provision website, online voting service, government services website may, for example, may receive requests from users to utilize such services, which may be restricted to users in certain jurisdictions. In one example, only users in a particular country or state may be allowed to consume content online from a website authorized to provide online content services in that jurisdiction. The geolocation verification system 170, for example, may be utilized to determine and/or verify the location of users and/or user devices requesting to access restricted access services. The restricted access services system 180 and/or geolocation verification system 170 may be used, for example, to (i) register users with the restricted access services system 180, (ii) login and/or authenticate users attempting to access online services, (iii) determine geolocation data from one or more location data sources, (iv) analyze geolocation data (e.g., in accordance with geolocation analysis rules) to determine a location of a user and/or user device (e.g., a cell phone or other mobile device), and/or (v) determine whether a user is allowed or denied access to content of the restricted access services system 180 (e.g., based on a determined location of a user device).

In one or more embodiments user device(s) 102*a* comprise one or more devices (e.g., a desktop computer and a cell phone or other mobile device) owned and/or operated by a user (or potential user) of restricted access services system 180. Accordingly, in some embodiments the configuration of system 100 applies a technical solution (facilitated by one or more types of specific computing devices described in this disclosure) and substantially limited to addressing particular problems with technical solutions improving aspects of telecommunications, computer networking, user authentication, and/or compute system security. For example, in accordance with some embodiments, the system 100 may allow an online services provider to establish rules for determining and/or analyzing information about the location of users and/or devices, and/or allow or deny access to various types of computer systems based on geolocation information and/or geolocation analysis, as described in this disclosure.

Figure 2:
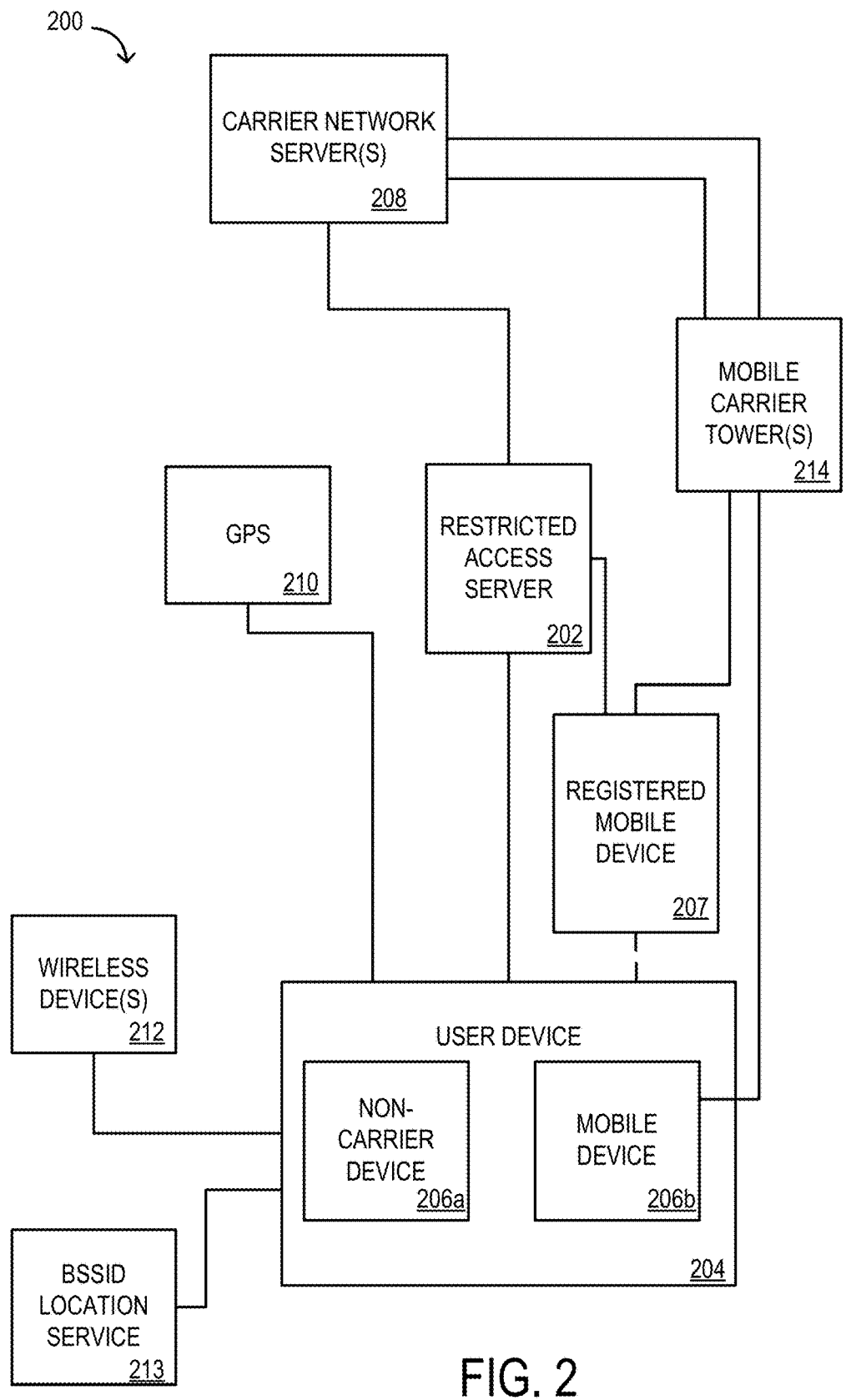
FIG. 2 is a block diagram of a system according to an embodiment of the present invention.

Referring to FIG. 2, a block diagram of a system 200 is shown according to some embodiments. In some embodiments, the system 200 may comprise device(s) 204 in communication (e.g., via a communications network (not shown)) with restricted access server 202, global positioning system (GPS) 210, wireless device(s) 212, and/or BSSID location service 213.

In some embodiments, the system 200 may be utilized to provide online services, some of which may be restricted to users in a predefined jurisdiction (e.g., a state, province, territory, county, city, township, or other predetermined geographical area). The user device 204, as depicted in FIG. 2, may comprise one or more non-carrier devices 206a and/or may comprise one or more mobile devices 206b. For example, a non-carrier device 206a may comprise a desktop computer, tablet computer, set-top box, console gaming system, or other type of computing device that is not connected to a cellular telephone network or other telecommunications carrier network. In another example, a device may comprise a mobile device 206b (e.g., a cellular phone, tablet computer with a carrier data plan, or the like) that may be connected to a cellular telephone network or other telecommunications carrier network. Accordingly, system 200 may comprise a mobile device 206b in communication (e.g., with a carrier's communication network) with one or more carrier mobile towers 214 and/or carrier network servers 208.

According to some embodiments, the system 200 may comprise a registered mobile device 207 in communication with the carrier mobile tower(s) 214. As described with respect to some processes discussed in this disclosure, a user may register a cell phone or other mobile device with restricted access server 202 (e.g., as part of an initial registration process with a website). A registered mobile device 207 may be used, in some embodiments, as part of a user login and/or authentication process, to verify (i) that a user is in possession of the registered mobile device 207 and/or (ii) that the user is co-located with the user device 204. According to some embodiments, the mobile device 206b being used as a device may be a registered mobile device. In one or more embodiments, a user authentication and/or geolocation analysis process may comprise the restricted access server 202 determining whether a user is associated with a registered mobile device. If so the restricted access server 202 may initiate a user authentication service (e.g., hosted by the server and/or provided by a third party authentication server) that transmits to the registered mobile device 207 an authentication code, such as a one-time or temporary authentication code generated and/or received from a two-factor authentication service (e.g., Authenticator™ service by Google, Inc.; Duo™ services by Duo Security). The restricted access server 202 may, for example, prompt the user to enter the authentication code via a user interface presented on the user device 204. Upon receiving a code from the user device 204, the authentication service compares the received code to the authentication code sent to the registered mobile device 207. If the codes match, the restricted access server 202 may store (e.g., in a geolocation information database) an indication that the user is in possession of the registered mobile device 207 and/or that the registered mobile device 207 is co-located with the user device 204 (if different from the registered mobile device 207).

According to some embodiments, registered mobile device 207 and/or mobile device 206b may be in communication with The restricted access server 202 may, for example, interface with user device 204 and/or carrier network server(s) 208, to request, acquire, gather, aggregate, process, and/or utilize user, geolocation, user device, registered mobile device, and/or other data or metrics in order to determine a location of user device 204 in accordance with one or more embodiments described in this disclosure (e.g., in order to allow or deny user access to online services and/or applications). In some embodiments, software instructions running on a user device 204 (e.g., implemented via HTML5 executed in a browser application and/or via a native client application) may facilitate one or more functions of the geolocation analysis process. Accordingly, steps described as being performed by the restricted access server 202 may, in some embodiments, be performed by a processor of a user device executing software instructions (e.g., downloaded by a user from a website or online store for smartphone apps).

In some embodiments, the restricted access server 202 may comprise a geolocation verification system (e.g., system 170 of FIG. 1) for determining, analyzing, and/or verifying a location of users and/or one or more devices (e.g., mobile device 206b, non-carrier device 206a, and/or registered mobile device 207) associated with users. In some embodiments, a device geolocation process may comprise determining, by a user device, location data based on information received from one or more geolocation data sources, such as GPS 201, wireless device(s) 212 (e.g., Wi-Fi wireless network routers), basic service set identification (BSSID) location service 213, and/or carrier mobile tower(s) 214 using the cellular radio of the user device (also referred to in this disclosure as "on-device" location data sources), and transmitting the determined location data to a geolocation verification system (e.g., hosted by restricted access server 202) for geolocation analysis. Some examples of BSSID location services are described below with respect to FIG. 4.

In some embodiments, the restricted access server 202 may request and receive location data for a mobile device 206b and/or registered mobile device 207 from the carrier network server(s) 208, which receives information about the location of the mobile device 206b and/or registered mobile device 207 from the carrier mobile tower(s) 214. In one embodiment, the restricted access server 202 may first determine whether a user has registered to allow the server to check the location of the registered mobile device 207.

According to some embodiments, a geolocation verification system (not shown) of the restricted access server 202 may utilize the location data (e.g., location data received from the user device 204 and/or the carrier network system(s) 208) to determine whether the user device 204 is in a jurisdiction that permits access to restricted access content or services, and if so, permit the user to receive or access such content.

Fewer or more components 202, 204, 206a-b, 207, 208, 210, 212, 213, 214 and/or various configurations of the depicted components of FIG. 2 may be included in the system 200 without deviating from the scope of embodiments described herein. In some embodiments, the components 202, 204, 206a-b, 207, 208, 210, 212, 213, 214 may be similar in configuration and/or functionality to similarly named components as described herein. In some embodiments, the system 200 (and/or portion thereof) may comprise a restricted access services platform programmed and/or otherwise configured to execute, conduct, and/or facilitate any of the various methods and/or portions or combinations thereof described herein.

Figure 3:
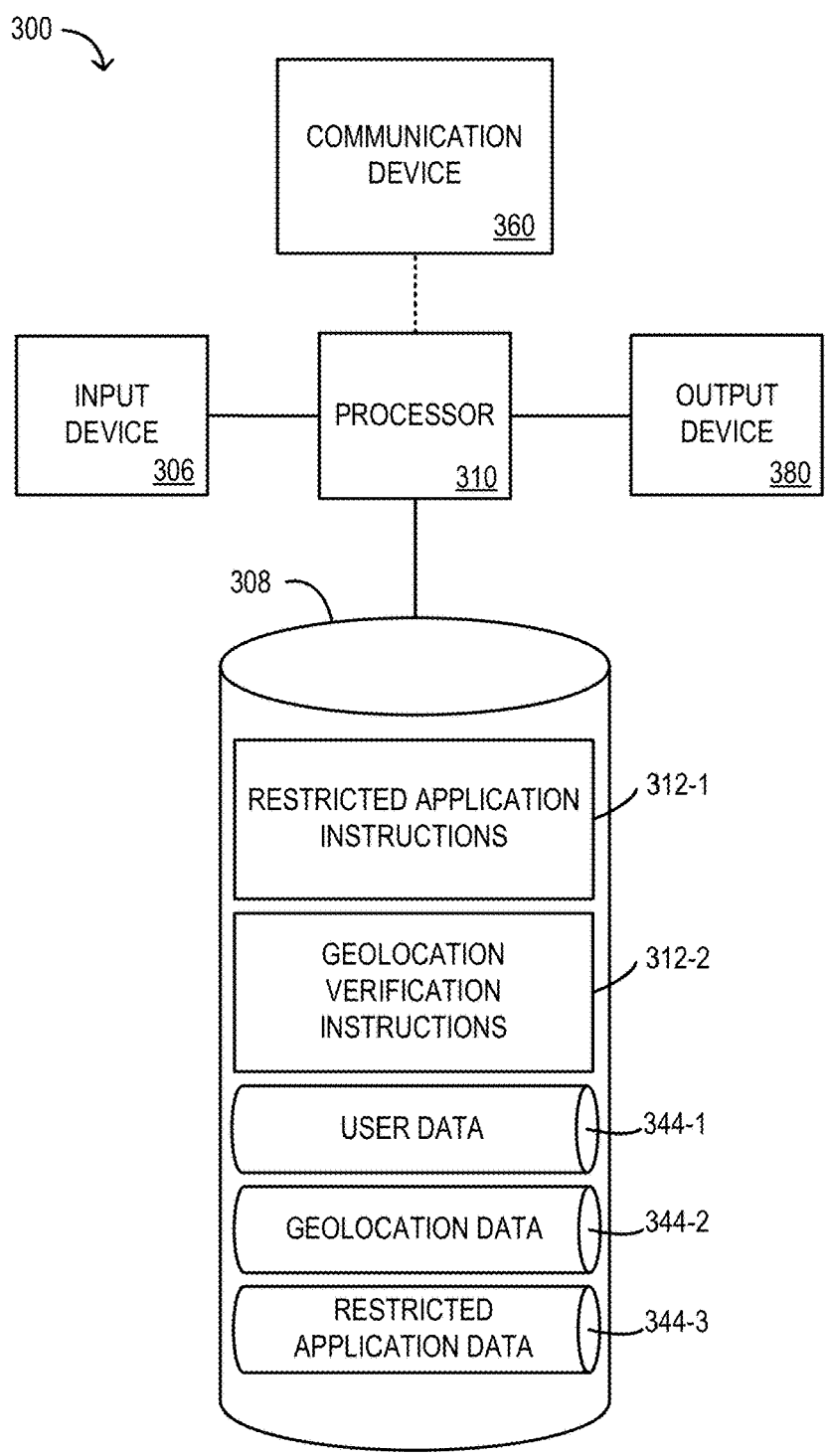
FIG. 3 is a diagram of a computing device according to an embodiment of the present invention.

Turning to FIG. 3, a block diagram of an apparatus 300 according to some embodiments is shown. In some embodiments, the apparatus 300 may be similar in configuration and/or functionality to any of the user devices 102*a*-*n*, user device 204, non-carrier device 206*a*, mobile device 206*b*, registered mobile device 207, third-party device 106, and/or the systems, servers and/or controller devices 170, 180, restricted access server 202 in this disclosure, and/or may otherwise comprise a portion of the systems 100, 200, 400 in this disclosure. The apparatus 300 may, for example, execute, process, facilitate, and/or otherwise be associated with the methods described in this disclosure.

In some embodiments, the apparatus 300 may comprise a processor 310, an input device 306, an output device 380, a communication device 360, and/or a memory device 308. According to some embodiments, any or all of the components 310, 306, 380, 360, 308 of the apparatus 300 may be similar in configuration and/or functionality to any similarly named and/or numbered components described in this disclosure. Fewer or more components 310, 306, 380, 360, 308 and/or various configurations of the components 310, 306, 380, 360, 308 may be included in the apparatus 300 without deviating from the scope of embodiments described in this disclosure.

According to some embodiments, the processor 310 may be or include any type, quantity, and/or configuration of electronic and/or computerized processor that is or becomes known. The processor 310 may comprise, for example, an Intel® IXP 2800 network processor or an Intel® XEON™ Processor coupled with an Intel® E7501 chipset. In some embodiments, the processor 310 may comprise multiple inter-connected processors, microprocessors, and/or micro-engines. According to some embodiments, the processor 310 (and/or the apparatus 300 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 300 comprises a server such as a blade server, necessary power may be supplied via a standard AC outlet, power strip, surge protector, a PDU, and/or Uninterruptible Power Supply (UPS) device.

In some embodiments, the input device 306 and/or the output device 380 are communicatively coupled to the processor 310 (e.g., via wired and/or wireless connections and/or pathways) and they may generally comprise any types or configurations of input and output components and/or devices that are or become known, respectively. The input device 306 may comprise, for example, a keyboard that allows an operator of the apparatus 300 to interface with the apparatus 300 (e.g., by a player, such as to register and/or participate in an online service as described in this disclosure). In some embodiments, the input device 306 may comprise a sensor configured to provide information (e.g., a user identifier) to the apparatus 300 and/or the processor 310. The output device 380 may, according to some embodiments, comprise a display screen and/or other practicable output component and/or device. The output device 380 may, for example, provide a user interface (not explicitly shown in FIG. 3) to a user (e.g., via a restricted access website). According to some embodiments, the input device 306 and/or the output device 380 may comprise and/or be embodied in a single device such as a touch-screen monitor.

In some embodiments, the communication device 360 may comprise any type or configuration of communication device that is or becomes known or practicable. The communication device 360 may, for example, comprise a network interface card (NIC), a telephonic device, a cellular network device, a router, a hub, a modem, and/or a communications port or cable. In some embodiments, the communication device 360 may be coupled to provide data to a user device (not shown in FIG. 3), such as in the case that the apparatus 300 is utilized to provide a user interface to a user as described in this disclosure. The communication device 360 may, for example, comprise a cellular telephone network transmission device that sends signals indicative of user interface components to a user's handheld, mobile, and/or telephone device. According to some embodiments, the communication device 360 may also or alternatively be coupled to the processor 310. In some embodiments, the communication device 360 may comprise an IR, RF, Bluetooth™, and/or Wi-Fi® network device coupled to facilitate communications between the processor 310 and another device (such as a user device and/or a third-party device).

The memory device 308 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 308 may, according to some embodiments, store one or more of restricted application instructions 312-1 and/or geolocation verification instructions 312-2. In some embodiments, the restricted application instructions 312-1 and/or geolocation verification instructions 312-2 may be utilized by the processor 310 to provide output information via the output device 380 and/or the communication device 360.

According to some embodiments, the restricted application instructions 312-1 may be operable to cause the processor 310 to process user data 344-1, geolocation data 344-2, and/or restricted application data 344-2. Player data 344-1, geolocation data 344-2, and/or restricted application data 344-2 received via the input device 306 and/or the communication device 360 may, for example, be analyzed, sorted, filtered, decoded, decompressed, ranked, scored, plotted, and/or otherwise processed by the processor 310 in accordance with the restricted application instructions 312-1 and/or geolocation verification instructions 344-2.

Any or all of the exemplary instructions and data types described in this disclosure and other practicable types of data may be stored in any number, type, and/or configuration of memory devices that is or becomes known. The memory device 308 may, for example, comprise one or more data tables or files, databases, table spaces, registers, and/or other storage structures. In some embodiments, multiple databases and/or storage structures (and/or multiple memory devices 308) may be utilized to store information associated with the apparatus 300. According to some embodiments, the memory device 308 may be incorporated into and/or otherwise coupled to the apparatus 300 (e.g., as shown) or may simply be accessible to the apparatus 300 (e.g., externally located and/or situated).

Figure 4:
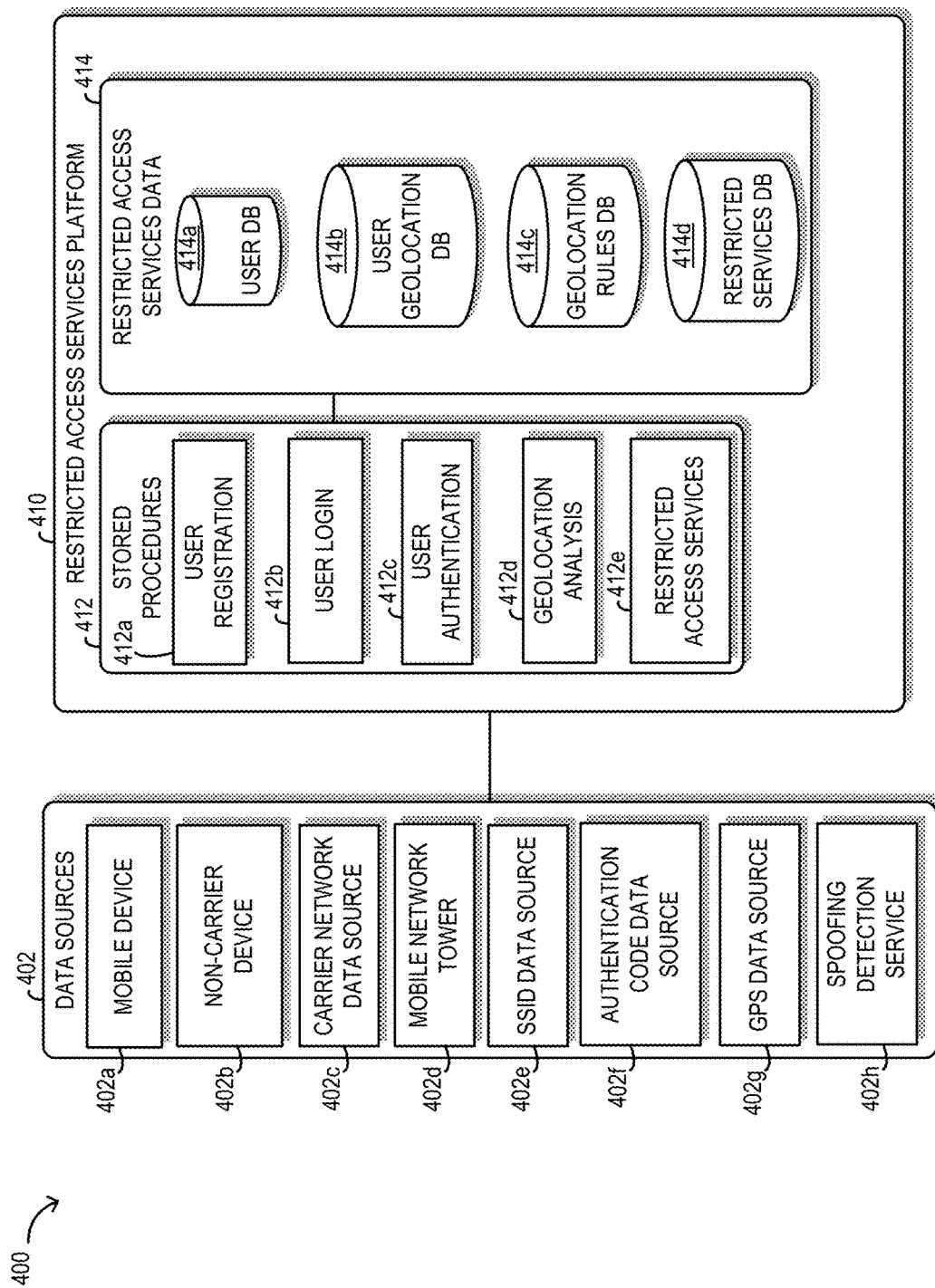
FIG. 4 is a diagram of a restricted access services system according to an embodiment of the present invention.

Referring now to FIG. 4, a block diagram of a system 400 according to some embodiments is shown. In some embodiments, the system 400 may comprise a plurality of data sources 402 and restricted access services platform 410. In some embodiments, the system 400 and/or the restricted access services platform 410 may comprise a plurality of stored procedures 412 and/or restricted access services data 414. According to some embodiments, any or all of the components 402, 410, 412, 414 of the system 400 may be similar in configuration and/or functionality to any similarly named and/or numbered components described in this disclosure. Fewer or more components 402, 410, 412, 414 (and/or portions thereof) and/or various configurations of the components 402, 410, 412, 414 may be included in the system 400 without deviating from the scope of embodiments described herein. Any component 402, 410, 412, 414 depicted in the system 400 may comprise a single device, a combination of devices and/or components 402, 410, 412, 414, and/or a plurality of devices, as is or becomes desirable and/or practicable. Similarly, in some embodiments, one or more of the various components 402, 410, 412, 414 (e.g., one or more types of data sources) may not be needed and/or desired in the system 400.

According to some embodiments, any or all of the data sources 402 may be coupled to, configured to, oriented to, and/or otherwise disposed to provide and/or communicate data to the restricted access services platform 410. A mobile device 402a (e.g., a smart phone registered with a restricted access service, a cell phone being utilized to request access to the restricted access services), a non-carrier device 402b (e.g., a networked computing device, such as a desktop computer or table computer, not associated with a carrier network or data plan), a carrier network data source 402c (e.g., a carrier server device storing and/or providing location data for a user device), a mobile network tower 402d (e.g., a cell tower that is part of a carrier's cellular network), a BSSID data source 402e, an authentication code data source 402f (e.g., a database operated by and/or accessed by a user authentication service to provide user authentication codes), a GPS data source 402g (e.g., a GPS satellite, a GPS receiver of a mobile device), and/or a spoofing detection service 402h (e.g., a native service of a mobile device that conducts one or more types of spoofing checks). In some embodiments, the data from the data sources 402a-h may comprise geolocation and/or other data descriptive of and/or otherwise associated with a user and/or a user device, and which may be used for the purpose of evaluating whether the user device is located in a particular geographical area.

According to some embodiments, the BSSID data source 402e may be provided by a location service that can look up the location of a Wi-Fi network based on its unique basic service set identification (BSSID and/or by its informal service set identification (SSID). A BSSID data source may be, for example, a publicly-available data source, such as Google Maps™ by Google, Inc., storing information identifying Wi-Fi networks and/or Wi-Fi router devices and their respective locations based on the BSSIDs received or detected by a user device with Wi-Fi capability.

In some embodiments, the data stored in any or all of the databases 402a-h may be utilized by the restricted access services platform 410. The restricted access services platform 410 may, for example, execute and/or initiate one or more of the stored procedures 412 to process the data in the databases 402a-h and/or restricted access services data 414 (or one or more portions thereof) and/or to define one or more tables or other types of data stores (e.g., for use in registering a user with a restricted access server, logging a user into a restricted access website, determining and/or analyzing geolocation data, and/or determining a location of a user and/or user device). In some embodiments, the stored procedures 412 may comprise one or more of user registration procedure 412a, user login procedure 412b, user authentication procedure 412c, geolocation analysis procedure 412d, and/or restricted access services procedure 412e.

According to some embodiments, the execution of the stored procedures 412a-e may define, identify, calculate, create, reference, access, update and/or determine one or more data tables or other data stores. In some embodiments, one or more of the data sources 402a-h and/or associated data tables 414a-d determined via one or more of stored procedures 412a-e may store information about one or more users, user devices, geolocation data, geolocation analysis rules, and/or one or more online services. Accordingly, any references to databases 402a-h in describing various embodiments in this disclosure may be understood as applying to, alternatively or in addition, one or more data stores 414a-d.

According to some embodiments, user registration procedure 412a may be configured to register a new user of a restricted access server (e.g., register a user to access content made available to users in certain geographical areas via a website). In some embodiments, as depicted in the example "New Customer" flow of HTML5 browser signup flow 700 of FIG. 7 and example "New Customer" native client initialization flow 800 of FIG. 8, different signup procedures may be utilized based on whether a user is using a browser application (e.g., based on HTML5) or a native client application. As depicted in the example signup flows 500, 600, a user registration procedure 412a may comprise determining (i) whether a user has a mobile device and/or (ii) determining whether a user agrees to have the location of the user's mobile device determined using a carrier geolocation process (e.g., by determining which tower(s) the mobile device may have accessed).

Figure 7:
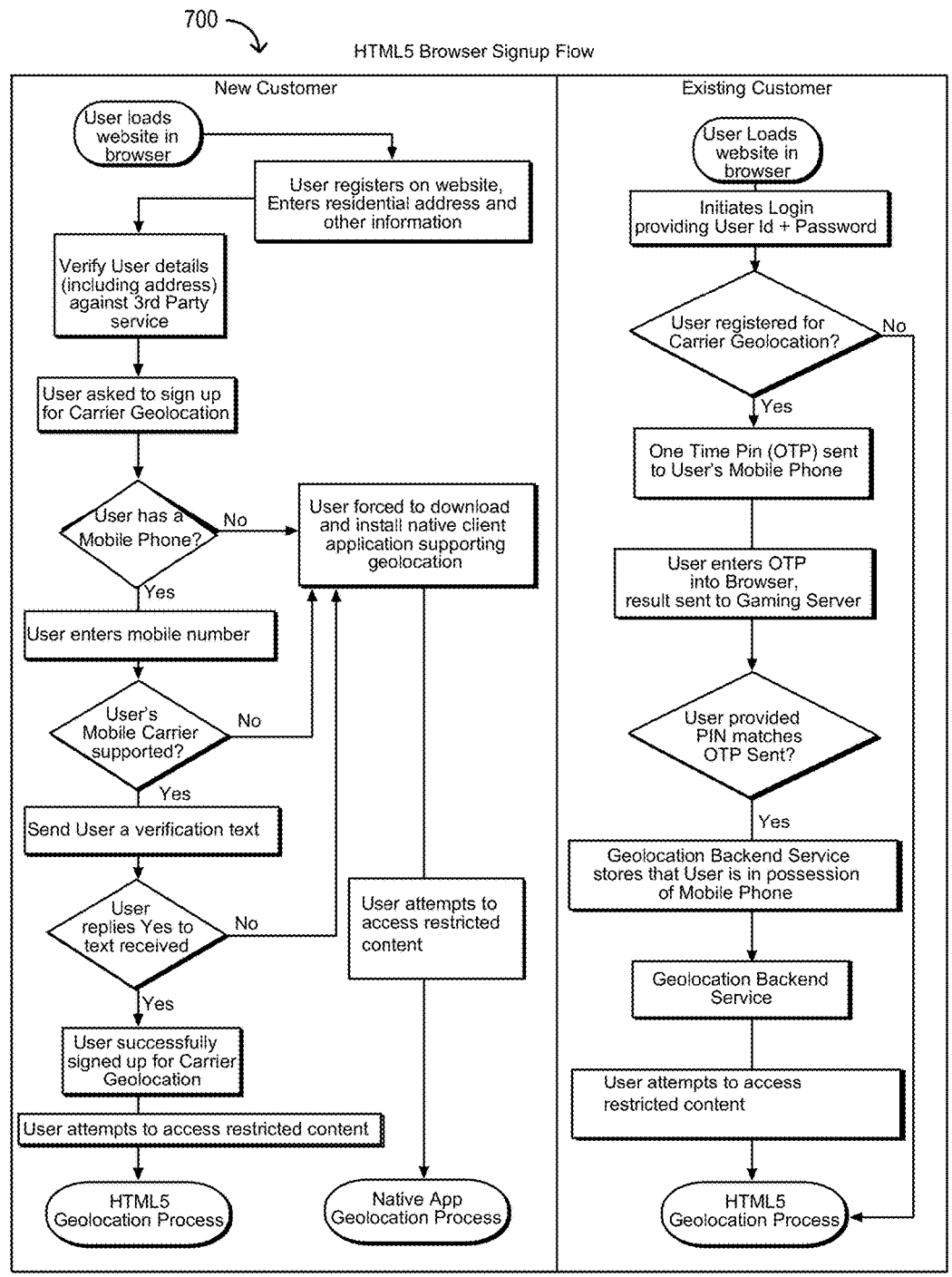
FIG. 7 is a flowchart of a method according to an embodiment of the present invention.
Figure 8:
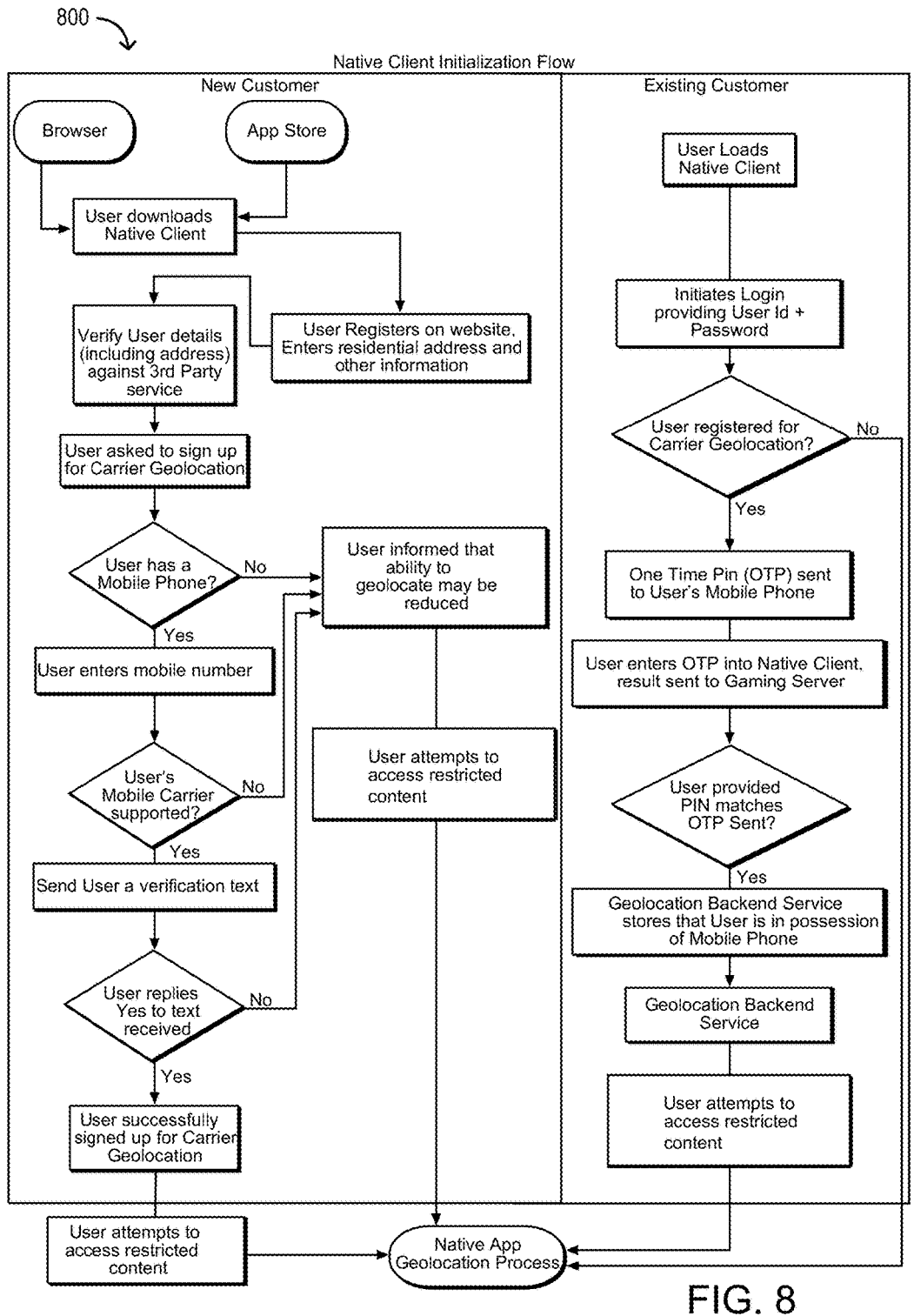
FIG. 8 is a flowchart of a method according to an embodiment of the present invention.

In one or more embodiments, user login procedure 412b may include instructions to direct a processor of a computerized processing device (e.g., of a user device) to receive and evaluate (e.g., based on user DB 414a) a request by a user to log in to a restricted access website and/or access restricted content or services. Further, in one or more embodiments, as depicted in the example "Existing Customer" flow of HTML5 browser signup flow 700 of FIG. 7 and example "Existing Customer" native client initialization flow 800 of FIG. 8, user authentication procedure 412c may include instructions to direct the computerized processing device to determine (e.g., based on user DB 414a and/or user geolocation DB 414b) whether a user is registered to be authenticated by a carrier geolocation process. If so, as depicted in FIG. 7 and FIG. 8, a two-factor authentication process may be initiated (e.g., by sending an authentication code to a mobile device registered with the restricted access server, and verifying any code received from the user device by which the user is attempting to log in to access restricted content) to determine whether the user is in possession of a registered mobile device and/or determining that a registered mobile device is co-located with a user device by which the user is attempting to access a restricted access website or other restricted content.

In one or more embodiments, geolocation analysis procedure 412d may include instructions to direct a processor of a computerized processing device (e.g., of a user device and/or restricted access server) to execute software instructions to (i) determine respective location data based on one or more location data sources (e.g., by retrieving location data from user geolocation DB 414b; and/or storing determined location data in user geolocation DB 414b), (ii)

determine one or more geolocation rules, respective accuracy values for one or more location data sources, relative ranking of location data sources, and/or geolocation scenarios (e.g., stored in geolocation rules DB 414c) for analyzing the location data, (iii) determine a location of a user device and/or registered mobile device, (iv) determine whether a user device is located in a predefined area (e.g., in a particular state or country), and/or (v) determining whether to allow or deny a user and/or user device access to restricted content (e.g., allow or deny a user device access to content restricted to a certain area or areas).

In one or more embodiments, restricted access services procedure 412e may include instructions to direct a processor of a computerized processing device (e.g., of a user device and/or restricted access server) to execute software instructions (e.g., based on game information in restricted services DB 414d) to provide for the restricted access services (e.g., an online service only available to registered users playing with user devices in a particular country, state, or province).

The process diagrams and flow diagrams described herein do not necessarily imply a fixed order to any depicted actions, steps, and/or procedures, and embodiments may generally be performed in any order that is practicable unless otherwise and specifically noted. Any of the processes and methods described herein may be performed and/or facilitated by hardware, software (including microcode), firmware, or any combination thereof. For example, a storage medium (e.g., a hard disk, data storage device, Random Access Memory (RAM) device, cache memory device, Universal Serial Bus (USB) mass storage device, and/or Digital Video Disk (DVD)) may store thereon instructions that when executed by a machine (such as a computerized processor) result in performance according to any one or more of the embodiments described in this disclosure.

C. Processes

According to some embodiments, processes described in this disclosure may be performed and/or implemented by and/or otherwise associated with one or more specialized and/or computerized processing devices (e.g., the devices described in this disclosure), specialized computers, computer terminals, computer servers, computer systems and/or networks, and/or any combinations thereof. In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

Figure 5:
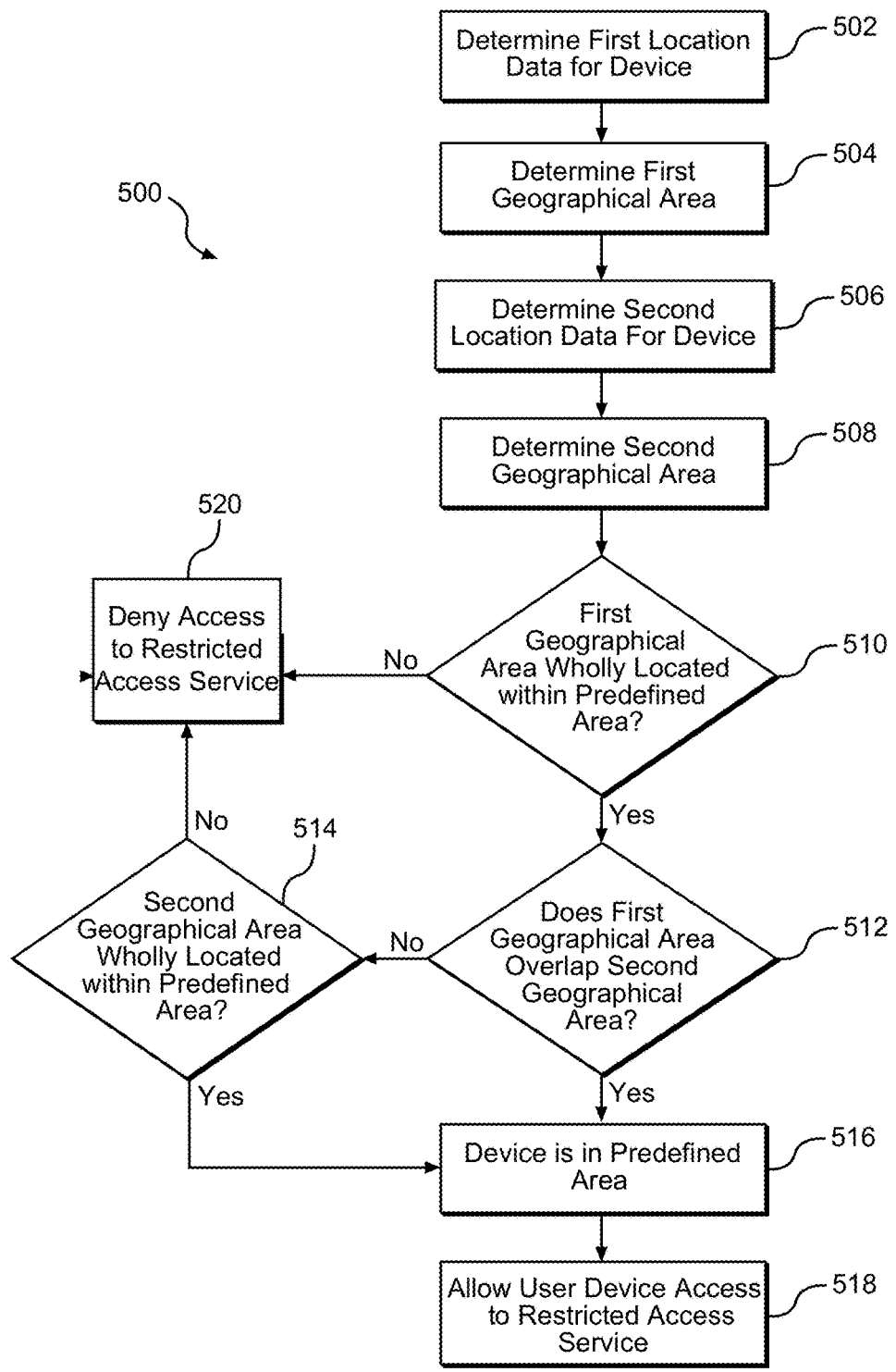
FIG. 5 is a flowchart of a method according to an embodiment of the present invention.

Referring now to FIG. 5, a flow diagram of a method 500 according to some embodiments is shown. According to some embodiments, the method 500 may comprise determining first location data (e.g., based on a first location data source) for a device, at 502, and determining a first geographical area, at 504. As described in this disclosure, determining location data may comprise determining a position, geographical location, GPS coordinates, and/or other type of location data, based on any of various types of location data sources, including but not limited to GPS, Wi-Fi, mobile tower site location and/or triangulation, internet protocol (IP) address, and carrier location. As described in this disclosure, in some embodiments the location data source may be an on-device location data source (e.g., derived from or received via a user device being located) or an off-device location data source (e.g., received from a mobile device carrier).

The following provides an overview of various example data sources that may be used, in accordance with some embodiments, to determine a device's location and/or the location of a user associated with a device.

GPS:

GPS is widely available on mobile devices and is highly accurate. Its accuracy typically ranges between 3 m and 10 m, depending on the GPS chipset used and/or the number of satellites that are visible when performing the lookup. Generally, four satellites are required for highly accurate location, but three may suffice. However, using GPS tends to drain the battery of a mobile device as it requires constant power. GPS lookups are also relatively slow, due to the time taken to synchronize with a geo-satellite.

Wi-Fi Location/Triangulation:

Numerous databases of public and private Wi-Fi wireless router BSSIDs or SSIDs and their corresponding geographical locations are available. The location of a user device may be determined using one or more wireless routers (e.g., by triangulating using the locations of all the wireless router BSSIDs or SSIDs a mobile device can detect). The accuracy of Wi-Fi-based location data typically depends on the density or number of Wi-Fi identifiers in the specified location and/or the signal strength of the wireless devices. In a populated area, this is generally 10 to 20 m, with the maximum range dictated by the maximum distance a wireless signal can travel (generally 200 m). In a sparsely populated area, Wi-Fi triangulation may become unusable if there are not enough BSSIDs accessible to determine the location. In one example, a location service may utilize a Wi-Fi device to detect other Wi-Fi devices and obtain their BSSIDs. The service may then look up the acquired BSSIDs in a Wi-Fi database (e.g., which may contain millions of these identifiers and their associated locations). Once locations for the BSSIDs are obtained, the location service may, in some embodiments, determine which of the available BSSIDs are in the same general latitude/longitude location. For instance, if three available BSSIDs indicate locations within New York City, but one shows a location in Los Angeles, the latter one may be discarded. Those identified locations deemed most accurate may be triangulated to determine the relative location of the user device.

Cell Site Triangulation:

The location of a user device may be determined, in accordance with some embodiments, by examining the cell tower sites a phone can detect and/or that the phone has previously been connected to. Advantages of cell tower location include the relative speed of locating the device and the fact that it has little or no additional impact on typical battery usage, as the client device is already constantly connecting to cell sites in order to maintain a cellular connection. The accuracy of this location data source typically depends on the density or number of cell sites in the area of the mobile device and/or the signal strength of the cell sites. In densely built-up areas, for example, a cellular network signal travels for a shorter distance, and mobile carriers typically install more cell sites. Higher density of cell sites results in greatest accuracy, down to approximately 50 m. In sparsely populated areas such as the countryside, for example, a signal may potentially travel up to 25 km, so mobile service carriers tend to install fewer cell sites. Accordingly, if the preceding scenario only one cell site is within range, the worst case accuracy value is 25 km. On average, if at least three cell sites are accessible, the accuracy range is within 1500 m.

Cell Site Identification:

If only one cellular network site is available, the accuracy of the location data solely depends on the site's range. In some instances it is possible to get location accuracy down to 500 m based on a single site; however, accuracy values are generally around 2 km. The range of a site depends on the number of sites that serve a given area. In the countryside, as discussed above, cell sites may serve signals up to a range of 25 km.

Internet Protocol (IP) Address:

Location services based on IP addresses (e.g., GEO-IP) have been in general use for several years. Such services typically rely on Internet service providers (ISPs) to subdivide the IP blocks they serve into regional areas, thereby allowing a particular device to be located by the region to which its static, assigned IP address belongs. Unfortunately this is only useful for static (e.g., cable) connections, and does not work for mobile carriers, as IP blocks are not limited to certain areas. Consequently, the IP address assigned to a client by a mobile carrier cannot be used to locate the player. Relative to the other location data sources described here, IP location is the least accurate.

Determining a geographical area may comprise, in some embodiments, determining the geographical area based on a particular position (e.g., cell tower site) or triangulated location and an accuracy radius or other type of accuracy value associated with the location data source. In some embodiments, respective accuracy values may be determined for each of one or more different types of location data sources (e.g., and stored in a database of geolocation rules). For example, the following table provides example accuracy values and example times required for determining location data using some example location data sources:

data source is utilized). In another example, a particular standard (e.g., an average) may be used as the accuracy value (e.g., 3 m) if GPS is used. In some cases, the accuracy value may correspond to a radius from the determined position, and determining the geographical area based on the determined location and the accuracy value, may comprise defining an area (e.g., a substantially circular area) that is within the associated radius from the position (e.g., within 200 m from the determined position).

According to some embodiments, the method 500 may comprise determining second location data for the device, at 506, and determining a second geographical area, at 508. In some embodiments, the second location data preferably is derived from a second location data source that is different from the location data source used to determine the first location data. For example, the first location data may be based on an on-device location data source (e.g., GPS) and the second location data may be based on an off-device location data source (e.g., carrier location), or vice versa. In another example, both the first and second location data may be based on off-device location data sources.

According to some embodiments, which of two or more location data sources are utilized may be determined in accordance with one or more rules and/or relative rankings (e.g., based on accuracy) of individual location data sources and/or combinations of available data sources. Accordingly, determining location data may comprise determine which location data sources are available, and, based on a respective prioritization or accuracy ranking of the data sources and potential combinations, selecting the first location data source and second location data source that have the highest priority. In some embodiments, at least one on-device location data source and at least one off-device location data source must be used; in other embodiments, any combination of data sources may be utilized. The following table provides some example combinations of example location

|  | GPS | Wi-Fi Triangulation | Cell Site Triangulation | Cell Site Identification | Internet Protocol (IP) |
|---|---|---|---|---|---|
| Minimum Range (meters) | 3 m | 20 m | 50 m | 500 m | 40 km |
| Average/Standard (meters) | 3 m | 50 m | 500 m | 1500 km | 40 km |
| Maximum Range (meters) | 10 m | 200 m | 25 km | 25 km | Unbounded |
| Time to Locate | 15-40 seconds | 1-2 seconds | 1-2 seconds | 3-9 seconds | 1-2 seconds |

In one example, a GPS location data source may be associated with an accuracy value from 3 m to 10 m (e.g., the current accuracy value may be determined at the time the data sources and authentication services for non-carrier devices (e.g., desktop computers), and example respective rankings of each combination.

| Priority | GPS | Wi-Fi Triangulation | Cell Triangulation | Cell Site | IP Address | 2-Factor Authentication | Accuracy Value |
|---|---|---|---|---|---|---|---|
| 1 |  | x |  |  | x |  | 20 m to 200 m |
| 2 |  | x |  | x |  | x | 20 m to 200 m |
| 3 |  |  |  | x | x | x | 500 m to 25 km |
| 4 |  |  |  | x | x |  | 500 m to 25 km |

The following table provides some example combinations of example location data sources and authentication services for mobile devices (e.g., cell phones, smart phones), and an example respective rankings of each combination.

| Priority | GPS | Wi-Fi Triangulation | Cell Triangulation | Cell Site | IP Address | 2-Factor Authentication | Accuracy |
| --- | --- | --- | --- | --- | --- | --- | --- |
| 1 | x |   |   | x |   | x | 3 m to 10 m |
| 2 |   | x |   | x |   | x | 20 m to 200 m |
| 3 |   |   | x | x |   | x | 50 m to 25 km |
| 4 | x |   |   | x |   |   | 3 m to 10 m |
| 5 |   | x |   | x |   |   | 20 m to 200 m |
| 6 |   |   | x | x |   |   | 50 m to 25 km |
| 7 | x | x |   |   |   |   | 3 m to 10 m |
| 8 |   | x |   |   | x |   | 20 m to 200 m |
| 9 | x |   |   |   |   |   | 3 m to 10 m |
| 10 |   |   | x |   |   |   | 50 m to 25 km |

According to some embodiments, the method 500 may comprise determining whether the first geographical area is wholly located within a predefined area, at 510. As described in this disclosure, it may be advantageous to determine, in some situations, whether a device is in a particular area (e.g., to determine whether certain services may be available to a user, to assist in rescue or emergency operations). Determining whether the first geographical area is wholly located within a predefined area may comprise looking up (e.g., in a database of geolocation data or geolocation analysis rules) or otherwise determining the countries, states, provinces, or the like, and/or GPS coordinates, included in a particular predefined area, and/or the location of borders defining a particular area. The defined area may then be compared to the area of the first geographical area to determine whether any of their respective GPS coordinates, for example, overlap.

For the purposes of this example method 500, it will be assumed that the first location data is derived from a location data source that is at least as accurate as the data source for the second location data. Accordingly, if the first geographical area is not wholly within the predefined area, the user and/or user device are denied access to restricted access services, at 520. Otherwise, the method 500 may continue to determine whether the first geographical area overlaps the second geographical area, at 512. If so, then the method 500 may continue to determine that the user device is in the predefined area, at 516. Otherwise, the method 500 may determine whether the second geographical area is wholly located within the predefined area, at 514. If so, then the method 500 may determine that the user device is in the predefined area, at 516. Otherwise, the user and/or user device are denied access to restricted access services, at 520.

According to some embodiments, the method 500 further may comprise determining whether a user is in possession of a user's registered mobile device. Ensuring that a user is actually in possession of his or her mobile device improves confidence in off-device location data sources (e.g., based on cell site triangulation or single cell sites) as being representative of a user's and/or user device's actual current location. For example, a two-factor authentication check may be conducted to verify that the user is in possession with the mobile device by requiring that the user input, to the user device being located, an authentication code transmitted to the registered mobile device. The user device may be the same device as the registered mobile device, or may be a different device (e.g., a desktop computer). According to some embodiments, the user must be in possession of the registered device (according to an example geolocation rule) in order for geolocation analysis to conclude that the user device is in a predefined area (e.g., because it is unlikely that the user is attempting to spoof his location). An authentication process may be performed during a log in process, for example, and/or prior to, during, or after determining location data for the device.

Figure 6A:
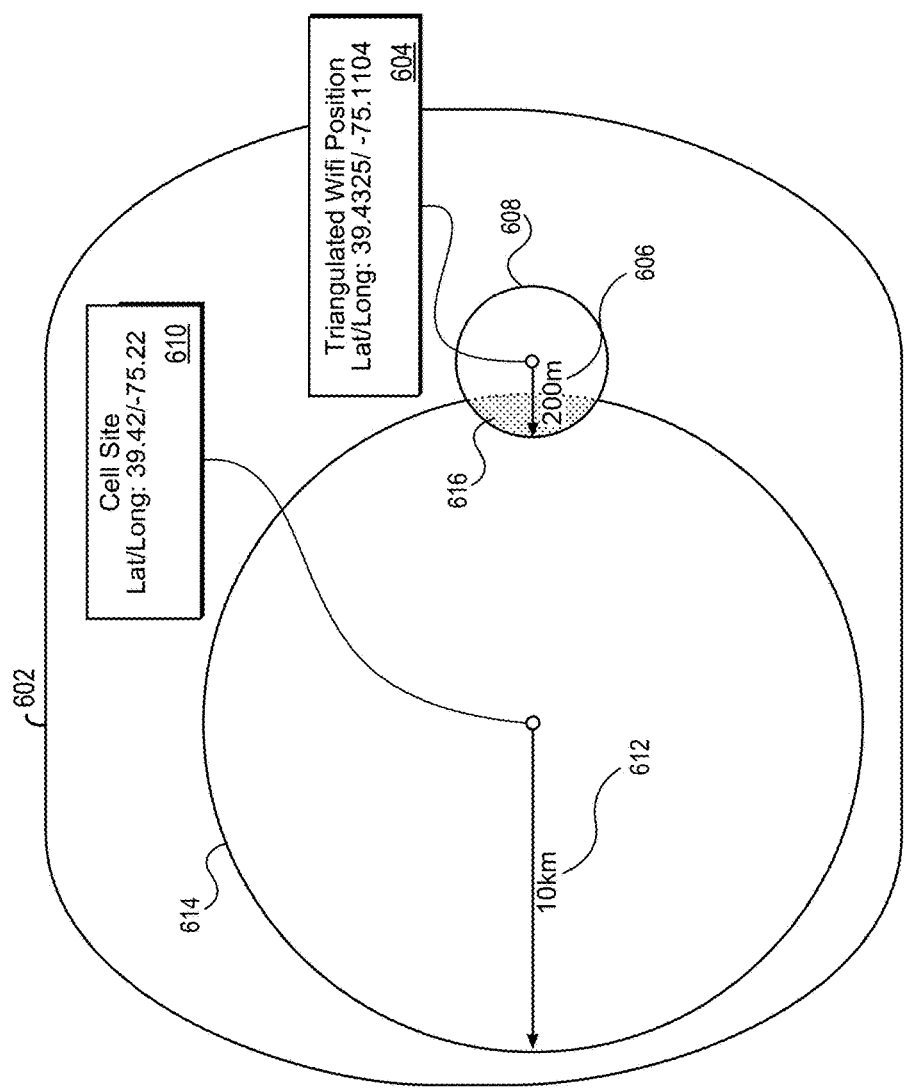
FIG. 6A, FIG. 6B, FIG. 6C, and FIG. 6D depict example scenarios for determining location data for a user device.

FIGS. 6A-6D depict some example geolocation scenarios based on location data derived using multiple location data sources. According to the example scenario depicted in FIG. 6A, a user has access to a first location data source that is based on Wi-Fi devices. According to the example, triangulation of the respective location data available for each of the plurality of Wi-Fi device locations (not shown) provides first location data (position 604) for the user device. The location data is associated with a first accuracy level 606 (200 m). The example scenario depicted in FIG. 6A also shows that a second location data source (a single cell tower) provides second location data, position 610, associated with a second accuracy level 612 (10 km). FIG. 6A also depicts an example first geographical area 608 associated with the Wi-Fi-based position 604 (based on the accuracy level 606) and a second geographical area 614 associated with the cell tower position 610 (based on the accuracy level 612). According to the example, based on the first and second geographical areas and one or more geolocation rules, because the user's triangulated Wi-Fi geographical area 608 is (i) wholly within the predefined area 602 and (ii) overlaps with the second geographical area 614 (at overlap area 616). This example indicates that the user's estimated location is both within the boundaries of the predefined area and that no spoofing has occurred, as the off-device carrier location overlaps with the Wi-Fi triangulated position, based on the respective accuracy limitations for each data source. Accordingly, the user may be allowed access to restricted access services via the user device. In some embodiments, it may be sufficient to allow access to restricted content if at least two location data sources (e.g., the two most accurate location data sources) are associated with geographical areas that are wholly within the predefined jurisdiction 602 (regardless of whether they overlap).

Figure 6B:
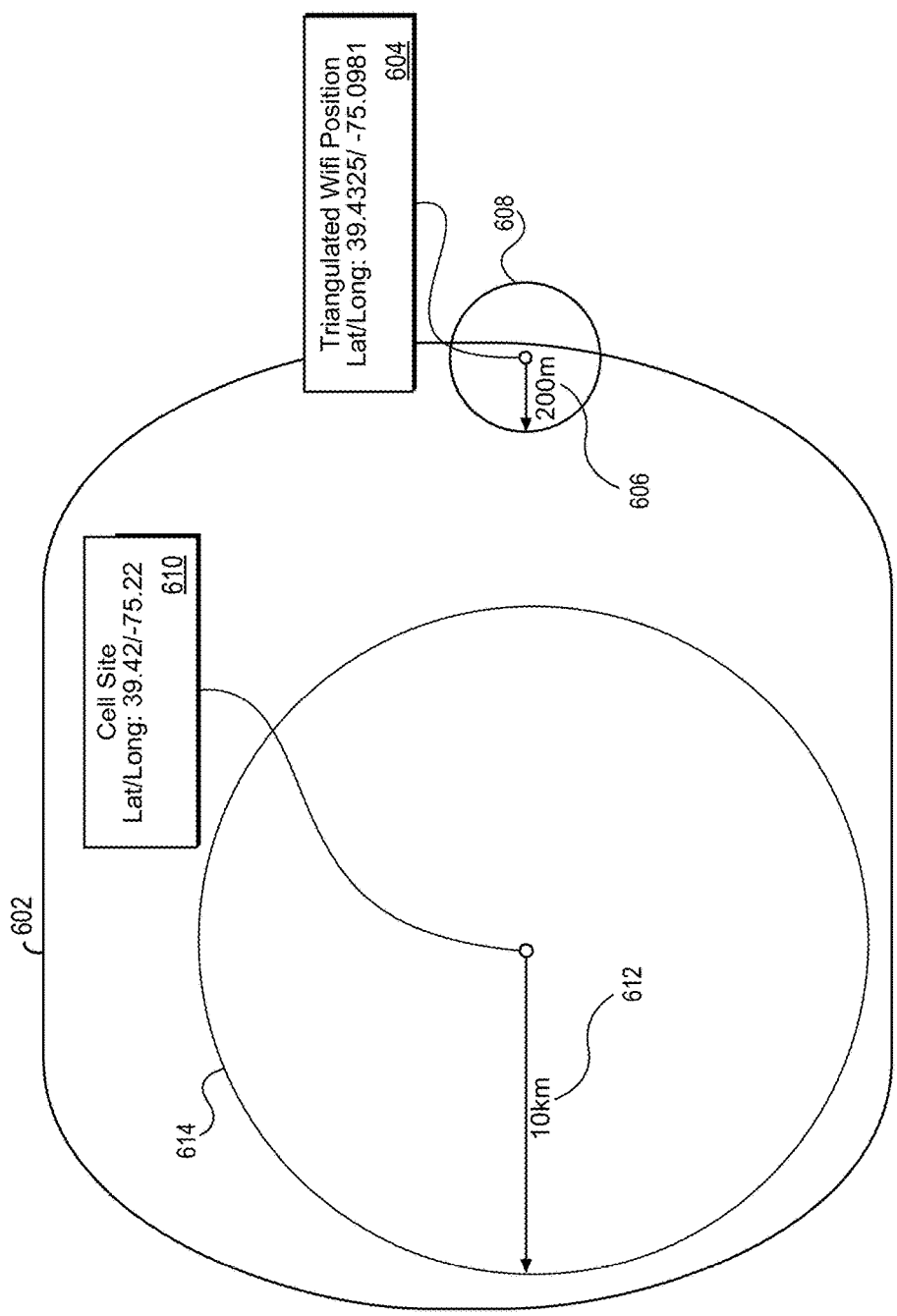

According to the example scenario depicted in FIG. 6B, the user may be prohibited from accessing restricted content or services for two reasons: (1) the triangulated Wi-Fi position of the user device (the more accurate of the two location data sources), taking into account the associated accuracy value 606, indicates that the user is potentially outside the predefined area 602; and (2) the geographical area 608 does not overlap with the second geographical area 614, indicating that spoofing may have taken place.

Figure 6C:
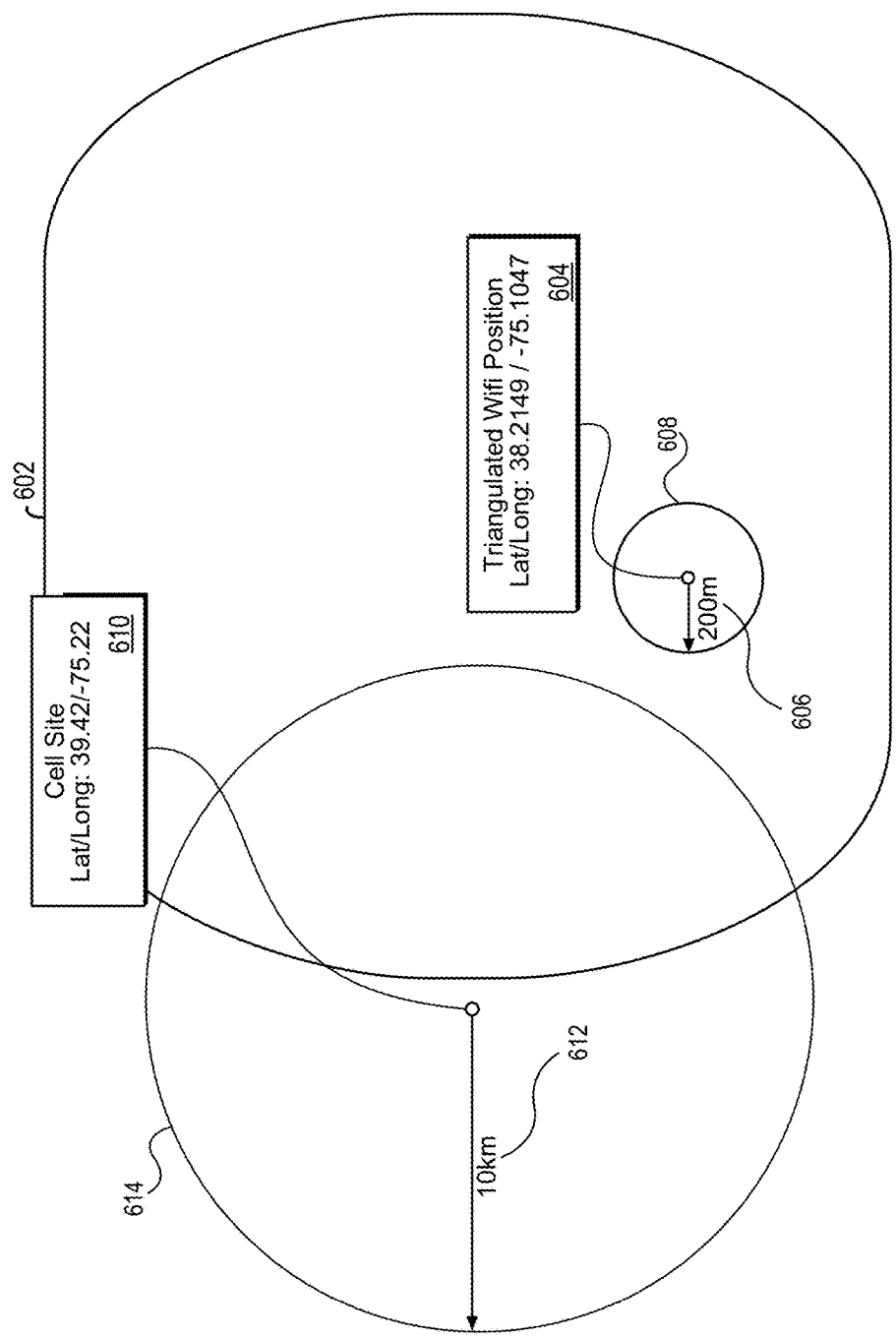

Similarly, according to the example scenario depicted in FIG. 6C, the user may be prohibited from accessing restricted content or services because, even though the more accurate location data source (the triangulated Wi-Fi position) indicates the user is wholly within the predefined area 602, the geographical area 608 does not overlap with the second geographical area 614, indicating that spoofing may have taken place.

Figure 6D:
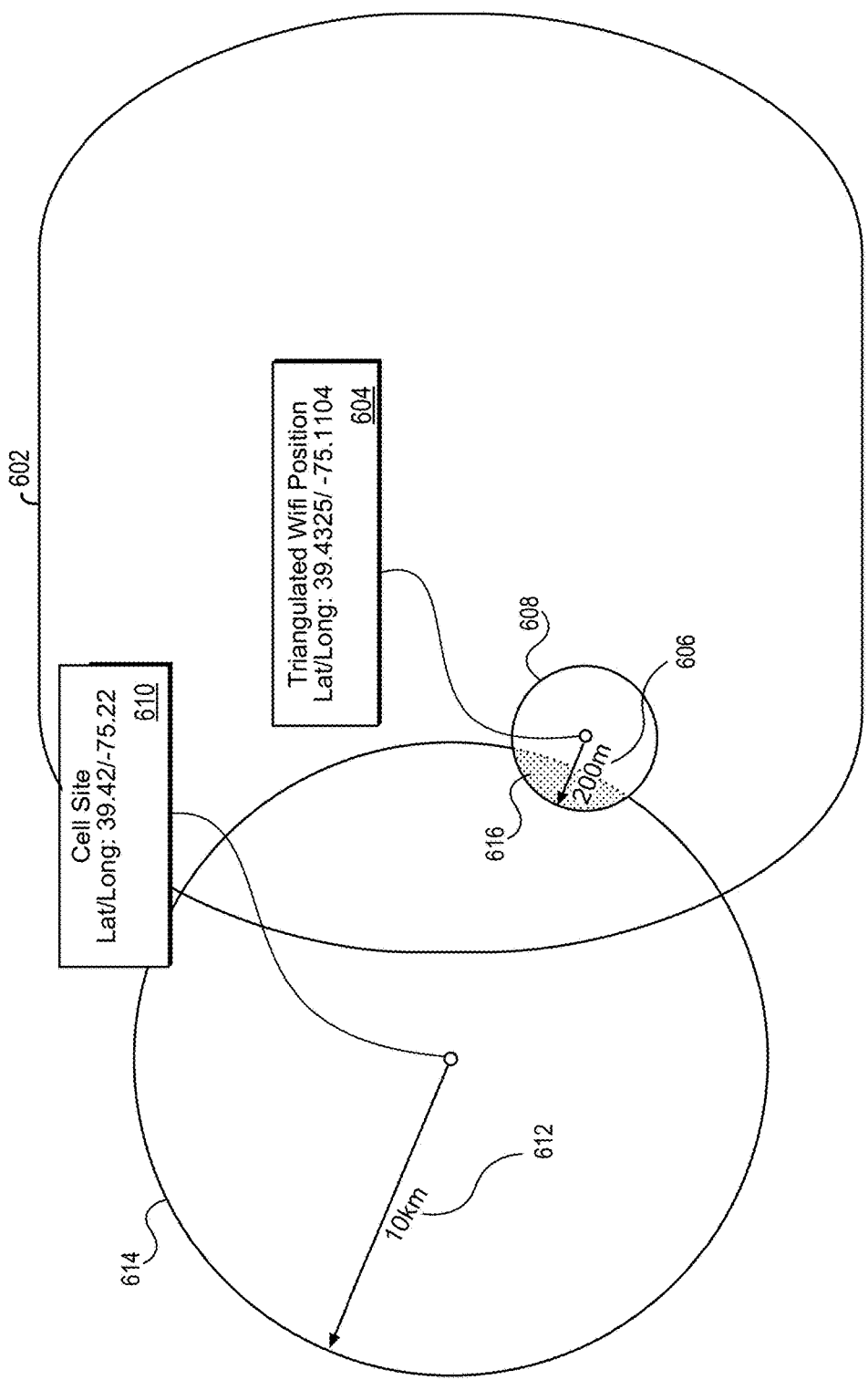

According to the example scenario depicted in FIG. 6D, the user may be allowed to access restricted access content or services (e.g., in accordance with geolocation rules). Even though the less accurate location data source (the carrier cell tower at position 610) indicates the user device could be outside the predefined area 602, the user's triangulated Wi-Fi location is (i) wholly within the predefined jurisdiction 602 and (ii) overlaps with the second geographical area 614 (at overlap area 616). This example indicates that the user's estimated location is both within the predefined area and that no spoofing has occurred.

According to some embodiments, a location data source based on a registered address for a user may be accessed (e.g., from a user database) in order to determine a jurisdiction in which the user lives. This information may be utilized and/or required in accordance with some geolocation rules, such as where a location data source indicates a user might be outside of the predefined jurisdiction. In one example, in the example scenario depicted in FIG. 6C, a user may be permitted access to restricted content if the user's residential address is in the predefined area 602 or is close to the border of the predefined area, and/or is in the predefined area and also within the geographical area 614, even though the geographical areas do not overlap. In another example, in the example scenario depicted in FIG. 6D, it may be required that the user also have a registered address that is in the predefined area 602 or within the geographical area 614 within the predefined area 602, before the user is allowed access to restricted content or services.

Figure 9:
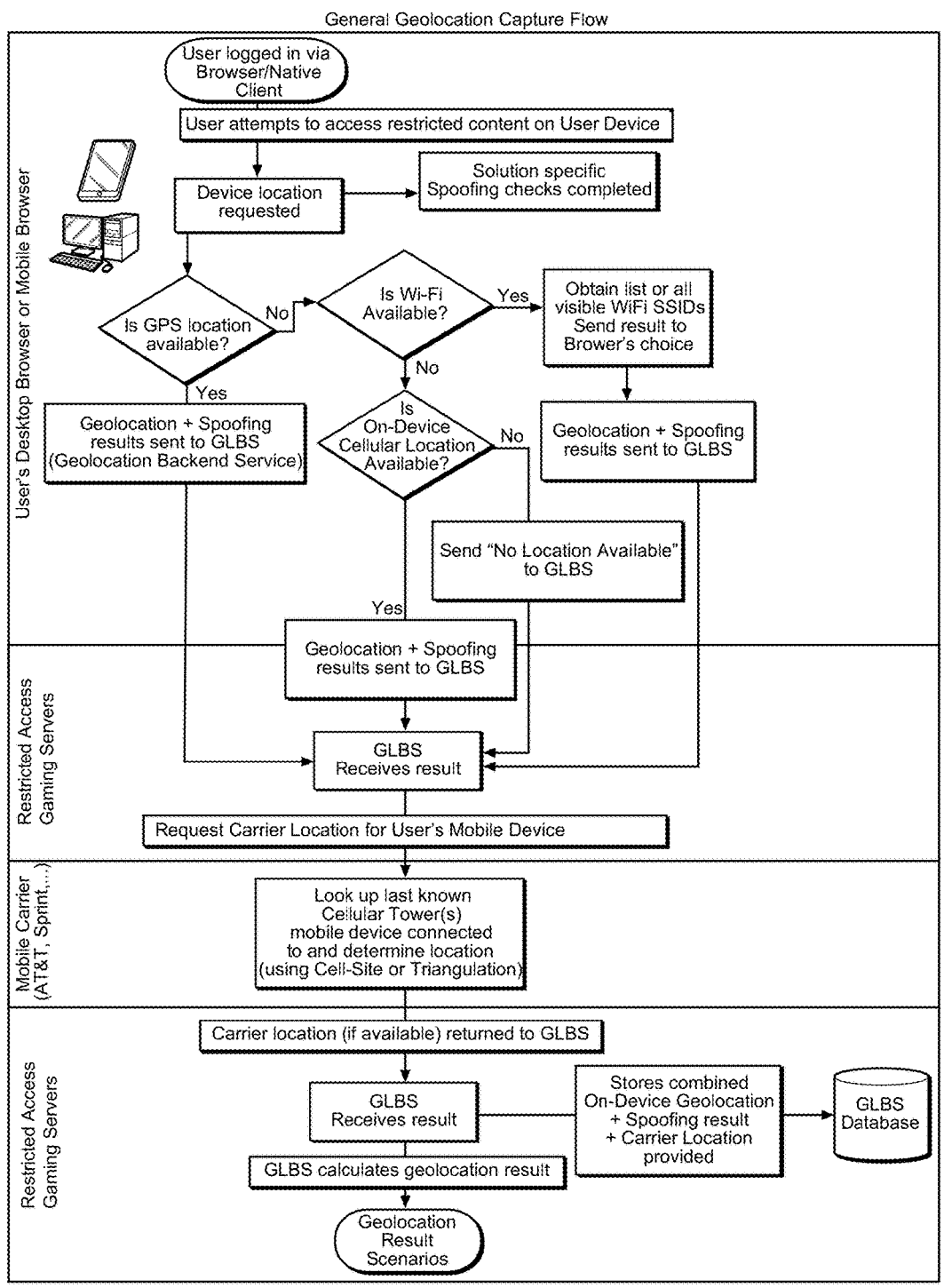
FIG. 9 is a flowchart of a method according to an embodiment of the present invention.
Figure 10:
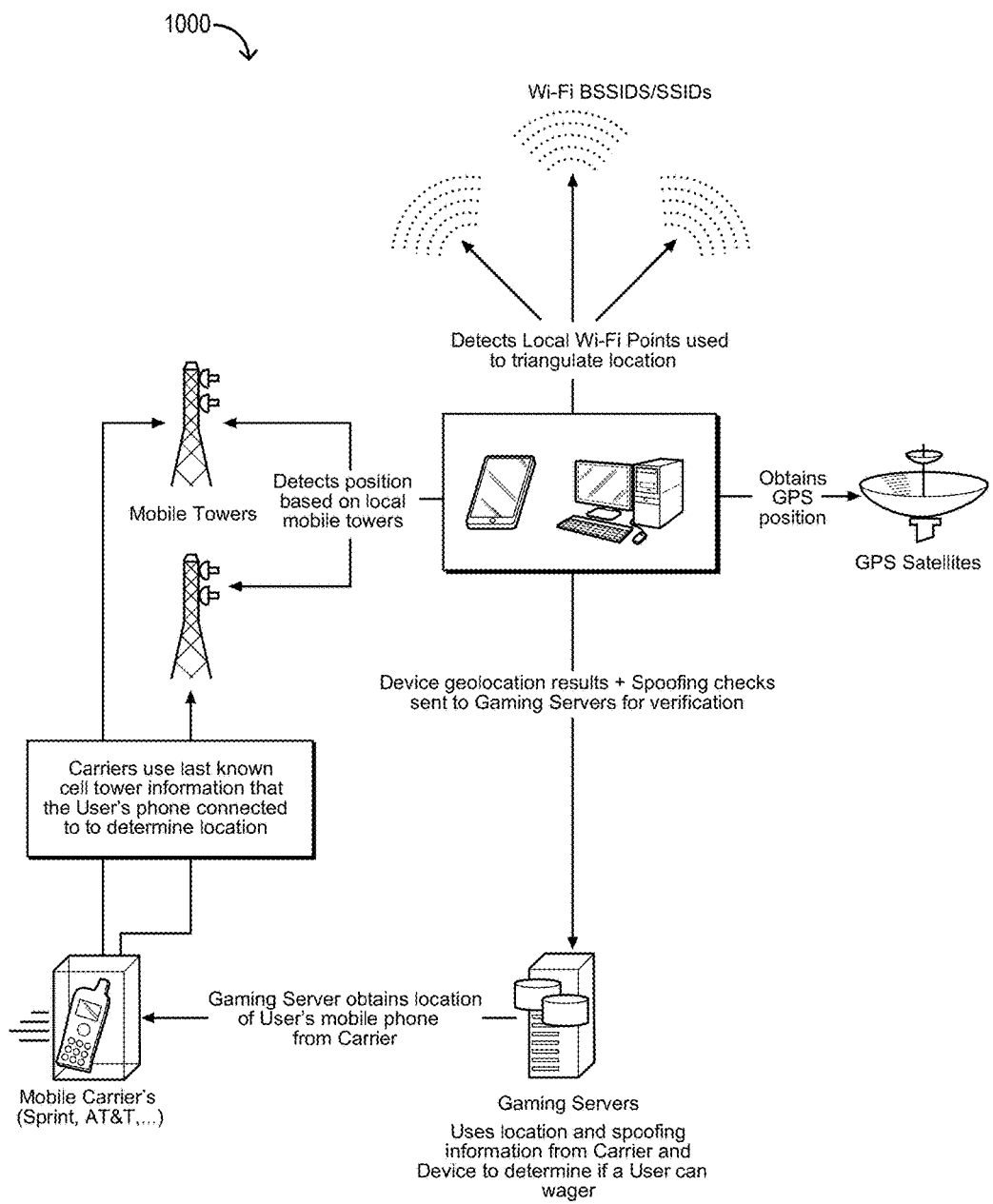
FIG. 10 is a diagram of a system according to an embodiment of the present invention.

Referring now to FIG. 9, a flow diagram of a method 900 according to some embodiments is shown. FIG. 10 depicts an example system 1000 comprising various components described with respect to example process 900 of FIG. 9. The method 900 may be performed, for example, by a server computer (e.g., Gaming Servers of FIG. 10) and/or a gaming device. It should be noted that although some of the steps of method 900 may be described as being performed by a server computer while other steps are described as being performed by a gaming device, any and all of the steps may be performed by a single computing device which may be a gaming server, mobile device, desktop computer, or another computing device. Further, any steps described herein as being performed by a particular computing device may, in some embodiments, be performed by another computing device as appropriate.

According to some embodiments, the method 900 may comprise a geolocation verification process (also referred to in this disclosure as a "geolocation capture flow") that may be useful in determining whether a gaming device (or other type of user device) is within a predefined jurisdiction (e.g., in which wager games are permitted). In a first part of the method 900, a user logs in to a gaming application (e.g., an HTML5-based or native client application) from a user device, such as by one of the "Existing Customer" workflows described in FIG. 7 and FIG. 8.

In response to the user attempting to place a wager using the user device, the process comprises determining a location of the device (e.g., based on one or more location data sources accessible by the device) and/or initiating one or more spoofing check processes to assess whether the device is attempting to spoof its location. In some embodiments, the device may determine location data based on one or more available data sources, including but not limited to: (i) a GPS data source (e.g., receiving GPS information from a built-in GPS receiver), (ii) a Wi-Fi data source (e.g., determining one or more Wi-Fi router devices in communication with the device), (iii) an SSID data source, and/or (iv) a mobile carrier tower or other cellular device location data source.

According to some embodiments, the user device may determine location (and/or time information) based on a global positioning system (GPS), a space-based satellite navigation system that provides location and time information in diverse weather conditions.

According to some embodiments, the user device may determine one or more respective SSIDs associated with Wi-Fi networks accessible by the user device. As will be readily understood by those of skill in the art, a Wi-Fi BSSID is the name of a wireless network visible to a user device. Various map service providers (e.g., Google Maps™ by Google, Inc., Bing™ by Microsoft, Apple Maps™ by Apple, Inc.) provide databases storing respective locations of known BSSIDs. In some embodiments, the accuracy of location information based on Wi-Fi data sources may be dependent on the number of SSIDs visible and their known locations. For instance, if only one SSID is visible, the accuracy value of that data source may be up to 400 m, but if three or more SSIDs are visible, a more accurate position may be obtained by triangulating the position of the device based on the respective location data for all three SSIDs.

In some embodiments, as described in this disclosure, carrier mobile towers used by mobile operators to serve cellular connections may be queried using a multilateration technique based on location information received (e.g., by the user device) from two or more radio towers. In one embodiment, an accuracy level associated with using the user device to determine a cellular location based on one or more carrier mobile towers may be approximately fifty meters.

According to some embodiments, all of the location data sources may be queried (and results forwarded to a gaming server for geolocation verification). According to some embodiments, one or more of the location data sources may be selected for use in determining the location of the user device based on a relative ranking of the accuracy of the location data sources (e.g., "High" accuracy, "Low" accuracy) and/or based on respective accuracy values (e.g., 200 meters, 10 kilometers, 50 meters) associated with the location data sources. According to some embodiments, location data sources may be queried in succession, in descending order of accuracy, until a location data source is found that can provide location information.

As described in this disclosure, the accuracy value associated with a location data source may be used (e.g., in conjunction with the location data received from that location data source), to determine a geographical area representative of the location data (e.g., substantially a circular area defined by the site of a cell tower and the accuracy value associated with the cell tower as a location data source). Information about ranking and/or accuracy values of different location data sources may be stored, for example, in a database (e.g., geolocation rules DB 414c, geolocation data 314-2).

In some embodiments, a native client application installed on a gaming device may be used to perform one or more spoofing checks to determine if a user is attempting to fake the device's location. For example, spoof checks may be conducted to detect potential spoofing based on one or more of the following: virtual private networks (VPNs), proxy servers, remote desktop programs, and/or use of specific software designed to provide fake Wi-Fi, GPS, and/or cellular data to a requesting application.

According to some embodiments, as depicted in example process 900, geolocation data stored by and/or retrieved by the user device may be forwarded to a gaming server and/or geolocation authentication system for geolocation analysis.

As used in this disclosure, a "mobile network operator" or "carrier" refers to a provider of wireless cellular services (e.g., for cell phones, smart phones, tablet computers with cellular data connections, etc.). Carriers typically own and operate radio towers for mobile devices (also referred to in this disclosure as "carrier mobile towers") that are used to connect a user's mobile device to the carrier's cellular communications network. Each mobile tower has a fixed, known location. Typically, every time a mobile device connects to a radio tower, the associate carrier stores a record of the radio tower to which it connected. Carrier geolocation (also referred to as "carrier location") uses the stored list of last known radio towers a mobile phone has connected to as a location data source.

Accordingly, in some embodiments, example process 900 may further comprise requesting, by the gaming server from a carrier network (e.g., carrier network server 208), a carrier location of a mobile device associated with a user (e.g., registered mobile device 207). The carrier network may, for example, determine one or more carrier mobile towers the mobile device connected to most recently and determine, based on the location data from one or more carrier mobile towers (e.g., based on the geographic location of the tower(s) and/or based on triangulation using location data from multiple towers), a carrier location of the mobile device.

In one embodiment, the example process 900 may further comprise storing location data and/or results of spoofing checks in a database (e.g., user geolocation DB 414*b*). In one or more embodiments, the example process 900 may further comprise analyzing the location and/or spoofing information determined by the user device and/or by the gaming server in order to determination (i) where the user device is located and/or (ii) whether to allow the user device access to restricted access services (e.g., online wagering games).

According to some embodiments, geolocation analysis procedures may comprise determining which, of a plurality of available location data sources, is the most accurate. Some geolocation rules may comprise, for example, determining whether the most accurate location data source indicates the user device is wholly within the predefined jurisdiction. If not, the geolocation analysis procedure may determine that the user device is not permitted to access restricted online services (even if the potential geographical area associated with the most accurate data source overlaps with the geographical area for another location data source) because of the risk of spoofing.

According to some embodiments, a device geolocation system may comprise a processor and a computer-readable memory in communication with the processor, the computer-readable memory storing instructions that when executed by the processor direct the processor to:

determine, using an on-device location data source, first location data associated with a device;

determine, using an off-device location data source, second location data associated with the device;

determine, based on the first location data and the second location data, that the device is within a predefined area;

determine that a user is in possession of the device; and after determining that the device is within the predefined area and after determining that the user is in possession of the device, transmitting restricted access content to the device.

Additional Embodiments

According to some embodiments, improved geolocation capabilities may be provided that optimize which data location data sources are used in order to decrease power consumption by user devices. In one example, using carrier geolocation as a location data source does not have any additional drain on a device's battery because it is based on information tracked and stored as the device connects with cell sites on the carrier network. Accordingly, an initial geolocation determination process for a user device may use GPS, Wi-Fi, cellular radio information, or some other more power intensive process, and may also, as discussed in this disclosure, corroborate the location data from those data sources with an off-device location data source. However, rather than continuously requesting the most accurate location information from the user's device in subsequent geolocation determination, the geolocation verification process may be configured to query only the carrier for the device's location from time to time (e.g., in accordance with a predetermined schedule or desired frequency). In one embodiment, the user device may be queried for location information only if the location data received from the carrier indicates that the user's location has changed by more than a predetermined threshold distance (e.g., in accordance with a geolocation rule). In that case, the geolocation verification process may again consult one or more on-device location data sources. This optimization of the use of various available location data sources may result in improved power use by and/or battery life of mobile devices.

Accordingly, some embodiments may provide for systems and methods providing for at least one of: determining an initial geolocation for a user device based on an on-device location data source (or based on a location data source requiring power consumption relatively higher than other potential location data sources); and determining at least one subsequent geolocation for the user device based on a carrier geolocation or other type of off-device location data source requiring relatively lower power consumption than the location data source used for the initial geolocation. In some embodiments, determining a subsequent geolocation may comprise making the determination after a predetermined period of time and/or in accordance with a predetermined frequency or schedule. In some embodiments, systems and methods may further provide for determining whether to perform a subsequence geolocation process using at least one on-device location data source (or location data source requiring power consumption relatively higher than other potential location data sources), either alone or in combination with carrier geolocation or other type of off-device location data source requiring relatively lower power consumption. In some embodiments, determining whether to use at least one location data source requiring relatively higher power consumption may comprise looking up (e.g., in a database) respective times required for location based on such data sources and/or respective indications of relative required power consumption (e.g., a respective power use rating for a given location data source). In some embodiments, determining whether to use at least one location data source requiring relatively higher power consumption may include determining whether the user device is within a predetermined distance of a predefined geographical area, jurisdiction, and/or border (in which case more accurate location data sources may be desirable even if they require more power from the user device).

In some embodiments, the frequency at which location is determined for a given user device may be increased or decreased, for example, based on the determined proximity of the user device to the edge of a predefined area or jurisdiction (e.g., how close a user is to a state border).

In some embodiments, as noted above with respect to FIG. 9 and FIG. 10, the restricted online service may comprise a gaming service (e.g., via a gaming website or mobile gaming application) and access to the service may be restricted to patrons of the gaming service. In one or more embodiments, in order to participate in online wagering or gambling games, for example, a patron's device must be located within an area coincident with a predefined jurisdiction that permits wager-based gaming (e.g., a particular state that permits licensed operators to provide online gambling services to users access a gambling website from within the state's borders).

In some embodiments, the system 200 (and/or portion thereof) may comprise a restricted access gaming services platform programmed and/or otherwise configured to execute, conduct, and/or facilitate any of the various methods and/or portions or combinations thereof described herein. According to some embodiments, the restricted online server 202 may utilize the location data (e.g., location data received from the user device 204 and/or the carrier network system(s) 208) to determine whether the user device 204 is in a jurisdiction that permits access to wagering games, and if so, permit the user to participate in wagering games (e.g., via a gaming website and/or via a native client application installed on a gaming device).

Some embodiments described in this disclosure may provide for using both on-device geolocation support and off-device geolocation support (e.g., GSM Cell Site Identification) and allowing patrons to play gambling games only if both the on-device geolocation information and the off-device geolocation information indicate the patron is in an appropriate jurisdiction (e.g., the two datasets match or otherwise are consistent). Such embodiments may dramatically reduce the risk of spoofing.

Some embodiments may further provide for utilizing the most accurate geolocation mechanism available and, taking into account the distance to the border, determining whether or not to allow a player to gamble given the worst case scenario.

According to some embodiments, on-device geolocation methods may include one or more of GPS, GSM, Wi-Fi and IP-based location services, such as those provided by Geo-Comply. In some embodiments, off-device geolocation information may be provided based on GSM cell site identification, such as the service provided for mobile devices by Locaid. One or more types of authentication services may also be utilized, such as the two-factor authentication across the web provided by Duo Security, in accordance with some embodiments.

Some embodiments may combine, advantageously, on-device geolocation, off-device geolocation, and authentication services to ensure a high level of location confidence, with a reduced risk of workarounds and spoofing. For desktop devices, location of the device may be accurately determined to within 20 and 200 m. For mobile devices, location of the device may be determined to within 3 and 500 m accuracy.

According to some embodiments, only devices running a native geolocation application may be supported. For desktop devices, for example, a patron must either have installed a browser plugin, or a desktop application. For mobile devices, for example, such as those running the iOS operating system by Apple, Inc., the patron must have installed an application from the Apple App Store™. Ensuring a patron has a native client running on their device reduces the risk of location spoofing and tampering, which is relatively easy with only a browser (e.g., an HTML5-based geolocation solution).

Although for purposes of discussion some embodiments described in this disclosure may be discussed with respect to mobile devices running the iOS operating system by Apple, it will be understood that various embodiments may be implemented using native clients for other types of device operating systems (e.g., Windows™ Mobile, Android™ by Google, Inc.).

According to some embodiments, the native applications, such as the browser plugin, desktop download client, and/or iOS application may each contain client libraries for on-device geolocation functionality. These libraries provide the geolocation services to the browser, and may be used for interrogating a variety of geolocation methods available on the device.

As discussed in this disclosure, in some embodiments our solution may augment the result provided by an on-device service with off-device data available through integration with an off-device service. Some types of off-device services (e.g., the Locaid carrier location service) make available cell site information for mobile devices. For example, when a mobile device connects to a cell tower, it leaves a footprint in the records that can be retrieved later.

Through the use of the off-device geolocation service, a geolocation verification process may check whether the on-device location sources have been spoofed or whether the phone has been left in an attempt to work around geolocation regulations, as geolocation verification process may have another location reading as a cross-reference.

For example, a patron leaves his mobile phone at home in New Jersey, and takes his laptop across the state border to New York, to play at work. In some embodiments, the geolocation verification system would take two locating readings, one from the phone, which places him within New Jersey, and one from the laptop, which places the patron outside of New Jersey. In this scenario, a geolocation verification process may have identified a discrepancy between the on- and off-device readings, potentially indicating that the patron is out of state, as he has not been able to spoof both the on- and off-device readings.

Combining multiple locations' readings together (e.g., from at least one on-device source and at least one off-device source), in accordance with some embodiments described in this disclosure, gives a stronger geolocation solution. Accessing additional data sources increases the difficulty for a patron to work around any geolocation restrictions.

For some embodiments, additional measures may be taken to reduce the ability for someone to work around the geolocation methods. For example, for on-device sources, natively installed geolocation libraries may be used, rather than relying on a pure browser based approach. In another example, for off-device sources, authentication services may be used (e.g., 2-factor authentication services provided by Duo Security) in conjunction with GSM cell site identification or other type of off-device geolocation method.

As discussed in this disclosure, an off-device source (e.g., Locaid) may be used, in accordance with some embodiments, to increase the confidence in the results obtained using on-device data location sources. In some embodiments, however, an off-device source may be used as a geolocation source in its own right. A location determined by Locaid could, for example, depending on the methods available on the device, be the strongest source available to locate a patron.

Some of the embodiments advantageously may remove the risk of a patron leaving a mobile phone or cellular device in one location (e.g., in order to be located in New Jersey), when in fact the patron is in a different location (e.g., outside of New Jersey). For example, using a carrier network-based service in conjunction with an authentication service to strongly authenticate a patron on a site (e.g., a gaming site) may provide an increased level of security, while also ensuring that the patron is in possession of their mobile device at the start of a gaming session. For instance, where a mobile device used as the second factor during an authenticated login is the same device that is used for off-device carrier geolocation, a restricted access service provider may have greater confidence in the off-device location results because the user is with the mobile device being tracked by the carrier.

Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

As used in this disclosure, a "user" may generally refer to any individual and/or entity that operates a user device. Users may comprise, for example, patrons of a gaming website, customers, consumers, etc.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the term "network component" may refer to a network device, or a component, piece, portion, or combination of a network device. Examples of network components may include a Static Random Access Memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., appropriately- and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated amongst a variety of devices.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:
1. A method for restricting access to services, comprising:
determining, using a first location data source, a first position associated with a first user device;
defining, based on the first position and the first location data source, a first geographical area that includes the first position;

determining, using a second location data source, a second position associated with a second user device,
  wherein the second location data source is not less accurate than the first location data source;
defining, based on the second position and the second location data source, a second geographical area that includes the second position;
determining that a user is in possession of the second user device;
determining that the following conditions are satisfied:
  (i) that the first geographical area and the second geographical area overlap,
  (ii) that at least one of the first geographical area and the second geographical is wholly located within a predefined area, and
  (iii) that the second position is located within the predefined area;
after determining that the user is in possession of the second user device and after determining that the conditions (i), (ii), and (iii) are satisfied, determining that the first user device is located in the predefined area; and
after determining that the first user device is located in the predefined area, allowing the first user device to access a restricted access service,
  wherein use of the restricted access service is restricted to users located in the predefined area.

2. The method of claim 1, wherein the first location data source is associated with a first accuracy radius, and wherein the first geographical area comprises a substantially circular geographical area defined by the first position and the first accuracy radius.

3. The method of claim 1, further comprising:
receiving, from the first user device, a request to grant the first user device access to the restricted access service.

4. The method of claim 1, wherein determining that the user is in possession of the second user device comprises:
  receiving an authentication code via the second user device; and
  verifying the authentication code received via the second user device.

5. The method of claim 1, wherein determining that the user is in possession of the second user device comprises:
  transmitting a one-time authentication code to the second user device;
  after transmitting the one-time authentication code to the second user device, receiving the one-time authentication code from the second user device; and
  verifying the one-time authentication code received from the second user device.

6. The method of claim 1, wherein at least one of the first location data source and the second location data source comprises an on-device location data source.

7. The method of claim 6, wherein the on-device location data source comprises one or more of the following types of on-device location data sources:
  a GPS receiver,
  a location data source based on one or more Wi-Fi networks, and
  a location data source based on one or more cell sites.

8. The method of claim 1, wherein at least one of the first location data source and the second location data source comprises an off-device location data source.

9. The method of claim 8, wherein the off-device location data source comprises information received from a carrier network.

10. The method of claim 1, wherein allowing the first user device to access the restricted access service comprises:
  allowing the user to place a wager in an online wagering game.

11. The method of claim 1, wherein determining that the first user device is located in the predefined area comprises determining that the first user device is located in the predefined area based on at least one geolocation rule.

12. A method for restricting access to services, comprising:
determining, using a first location data source, a first position associated with a first user device;
defining, based on the first position and the first location data source, a first geographical area that includes the first position;
determining, using a second location data source, a second position associated with a second user device,
  wherein the first location data source is not less accurate than the second location data source;
defining, based on the second position and the second location data source, a second geographical area that includes the second position;
determining that a user is in possession of the second user device;
determining that the following conditions are satisfied:
  (i) that the first geographical area and the second geographical area overlap,
  (ii) that at least one of the first geographical area and the second geographical is wholly located within a predefined area, and
  (iii) that the first position is located within the predefined area;
after determining that the user is in possession of the second user device and after determining that the conditions (i), (ii), and (iii) are satisfied, determining that the first user device is located in the predefined area; and
after determining that the first user device is located in the predefined area, allowing the first user device to access a restricted access service,
  wherein use of the restricted access service is restricted to users located in the predefined area.

13. The method of claim 12, wherein the first location data source is associated with a first accuracy radius, and wherein the first geographical area comprises a substantially circular geographical area defined by the first position and the first accuracy radius.

14. The method of claim 12, further comprising:
receiving, from the first user device, a request to grant the first user device access to the restricted access service.

15. The method of claim 12, wherein determining that the user is in possession of the second user device comprises:
  receiving an authentication code via the second user device; and
  verifying the authentication code received via the second user device.

16. The method of claim 12, wherein determining that the user is in possession of the second user device comprises:
  transmitting a one-time authentication code to the second user device;
  after transmitting the one-time authentication code to the second user device, receiving the one-time authentication code from the second user device; and
  verifying the one-time authentication code received from the second user device.

17. The method of claim 12, wherein at least one of the first location data source and the second location data source comprises an on-device location data source.

18. The method of claim 17, wherein the on-device location data source comprises one or more of the following types of on-device location data sources:
a GPS receiver,
a location data source based on one or more Wi-Fi networks, and
a location data source based on one or more cell sites.

19. The method of claim 12, wherein at least one of the first location data source and the second location data source comprises an off-device location data source.

20. The method of claim 19, wherein the off-device location data source comprises information received from a carrier network.

21. The method of claim 12, wherein allowing the first user device to access the restricted access service comprises:
allowing the user to place a wager in an online wagering game.

22. The method of claim 12, wherein determining that the first user device is located in the predefined area comprises determining that the first user device is located in the predefined area based on at least one geolocation rule.

* * * * *